US012794581B2

(12) United States Patent
de Koos et al.

(10) Patent No.: US 12,794,581 B2
(45) Date of Patent: Nov. 10, 2026

(54) TIMESTAMP AT A PARALLEL INTERFACE OF A SERDES COUPLING A PHY WITH A PHYSICAL TRANSMISSION MEDIUM

(71) Applicant: Microchip Technology Incorporated, Chandler, AZ (US)

(72) Inventors: Andras de Koos, Montreal (CA); Dany Lebel, Laval (CA)

(73) Assignee: Microchip Technology Incorporated, Chandler, AZ (US)

( * ) Notice: Subject to any disclaimer, the term of this patent is extended or adjusted under 35 U.S.C. 154(b) by 499 days.

(21) Appl. No.: 18/344,752

(22) Filed: Jun. 29, 2023

(65) Prior Publication Data

US 2024/0007214 A1 Jan. 4, 2024

Related U.S. Application Data

(60) Provisional application No. 63/367,286, filed on Jun. 29, 2022.

(51) Int. Cl.
*H04J 3/06* (2006.01)

(52) U.S. Cl.
CPC .................................. *H04J 3/0661* (2013.01)

(58) Field of Classification Search
CPC ...... H04J 3/0661; H04J 3/0697; H04J 3/0682; H04L 43/0852; H04L 69/28; H04L 43/0894; H03M 9/00
See application file for complete search history.

(56) References Cited

U.S. PATENT DOCUMENTS

| | | | | |
|---|---|---|---|---|
| 8,830,993 B1 * | 9/2014 | Dublin | H04L 49/00 370/376 |
| 8,949,448 B1 * | 2/2015 | Saxtorph | H04J 3/0667 341/61 |
| 9,935,707 B2 * | 4/2018 | Pepper | H04B 10/616 |
| 2008/0069014 A1 * | 3/2008 | Powell | H04L 5/1438 370/278 |
| 2010/0106917 A1 * | 4/2010 | Ruberg | G06F 13/1663 711/149 |

(Continued)

FOREIGN PATENT DOCUMENTS

| | | | |
|---|---|---|---|
| CN | 103488599 A * | 1/2014 | H04L 25/14 |
| CN | 112152748 A | 12/2020 | |

(Continued)

OTHER PUBLICATIONS

International Search Report for International Application No. PCT/US2023/069446, mailed Oct. 30, 2023, 6 pages.

(Continued)

*Primary Examiner* — Atique Ahmed
(74) *Attorney, Agent, or Firm* — TraskBritt

(57) ABSTRACT

One or more examples relate, generally, to timestamp at a parallel interface of a SerDes for coupling a PHY with a physical transmission medium. In an example, an apparatus includes a SerDes to couple a PHY to a physical transmission medium; a hardware timestamp logic; a bit detector coupled to initiate the hardware timestamp logic at least partially responsive to observing an indicated bit at a parallel interface of the SerDes; and a logic circuit provided at a portion of the PHY, the logic circuit coupled to receive timestamps generated by hardware timestamp logic.

20 Claims, 17 Drawing Sheets

(56) References Cited

U.S. PATENT DOCUMENTS

| | | | | |
|---|---|---|---|---|
| 2011/0292932 | A1* | 12/2011 | Nichols | H04L 49/45 370/376 |
| 2013/0341518 | A1* | 12/2013 | Fries | A61B 6/037 250/363.03 |
| 2013/0343409 | A1* | 12/2013 | Haulin | H04J 3/0697 370/503 |
| 2015/0055644 | A1 | 2/2015 | Bordogna et al. | |
| 2016/0006677 | A1* | 1/2016 | Lamb | H04L 49/9005 370/412 |
| 2018/0191802 | A1* | 7/2018 | Yang | G06Q 50/00 |
| 2020/0380370 | A1* | 12/2020 | Lie | G06F 17/10 |
| 2020/0412469 | A1* | 12/2020 | He | H04J 3/0602 |
| 2022/0248353 | A1* | 8/2022 | Liu | H04W 56/0015 |

FOREIGN PATENT DOCUMENTS

| | | | | | |
|---|---|---|---|---|---|
| CN | 112799983 | A | * | 5/2021 | G06F 13/385 |
| EP | 3883151 | A1 | * | 9/2021 | H04W 56/001 |

OTHER PUBLICATIONS

International Written Opinion for International Application No. PCT/2023/069446, mailed Oct. 30, 2023, 9 pages.

* cited by examiner

TIMESTAMP AT A PARALLEL INTERFACE OF A SERDES COUPLING A PHY WITH A PHYSICAL TRANSMISSION MEDIUM

CROSS-REFERENCE TO RELATED APPLICATION

This application claims the benefit under 35 U.S.C. § 119(e) of the priority date of U.S. Provisional Patent Application Ser. No. 63/367,286, filed Jun. 29, 2022, for HIGH-ACCURACY ETHERNET PTP TIMESTAMP WITHOUT PATH DATA DELAY MEASUREMENT, the contents and disclosure of which is incorporated herein in its entirety by this reference.

TECHNICAL FIELD

One or more examples relate, generally, to departure and arrival timestamping for Ethernet packets. One or more examples relate, generally, to departure and arrival timestamping at a Serial/Deserializer (SerDes) interface.

BACKGROUND

Packet arrival and departure times are used in a variety of operational contexts, including, without limitation, synchronizing time across networks.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
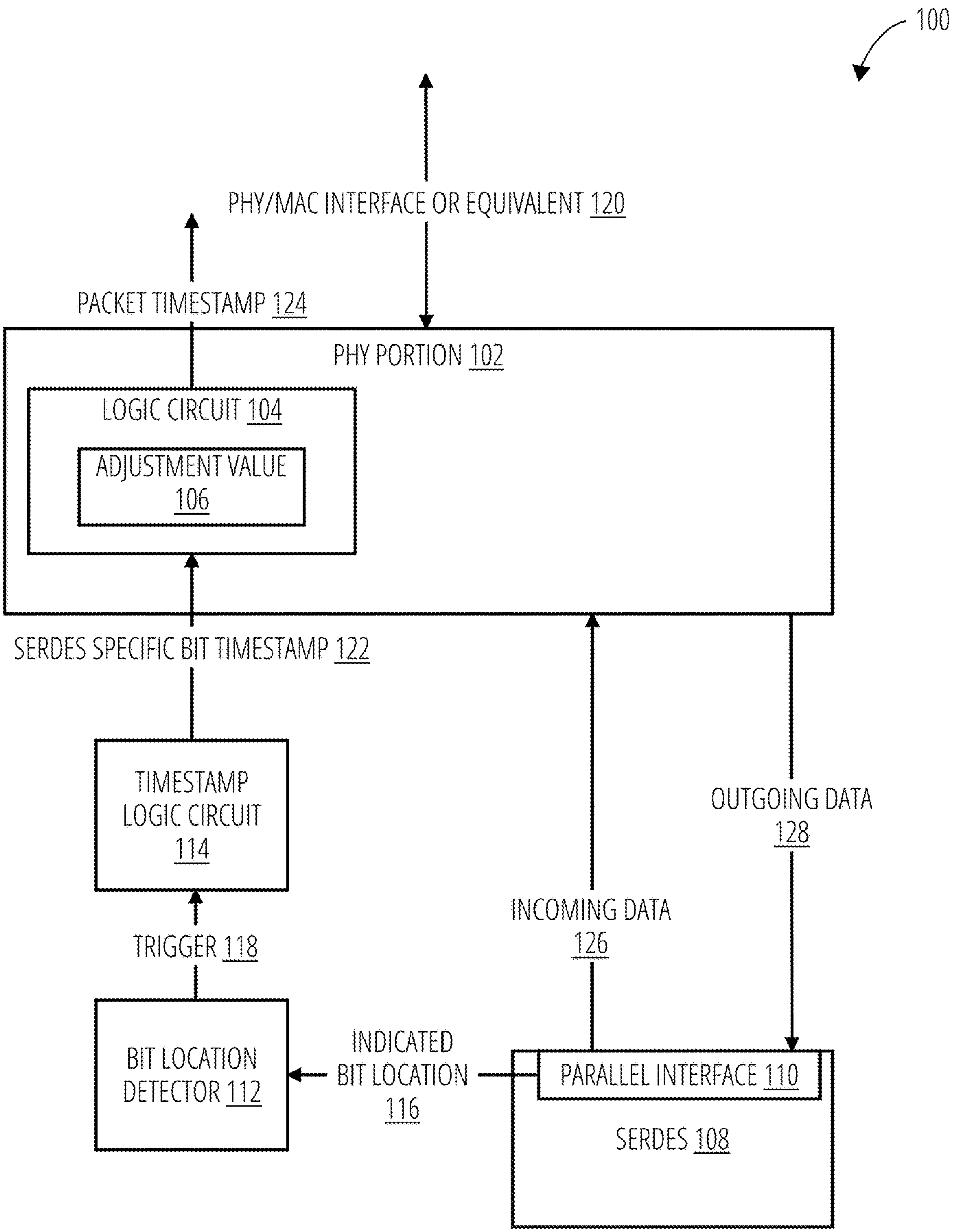
FIG. 1 is a block diagram depicting an apparatus for SerDes timestamping of indicated bits, in accordance with one or more examples.

In the following detailed description, reference is made to the accompanying drawings, which form a part hereof and, in which are shown by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure but is merely representative of various examples. While various aspects of examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

In this description the term "coupled," and derivatives thereof, may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The terms "on" and "connected" may be used in this description interchangeably with the term "coupled," and have the same meaning unless expressly indicated otherwise or the context would indicate otherwise to a person having ordinary skill in the art.

Measuring the latency between a Media-Independent-Interface (MII) and a Media-Dependent-Interface (MDI) is "logically" provided in the 802.3 technology standard (and derivatives thereof), currently under specification by the 802.3 working group of the Institute of Electrical and Electronics Engineers (IEEE) ("IEEE 802.3" or just "802.3").

The MII is an interface (e.g., physical, logical, or both, without limitation) between a physical layer (PHY) and a media access control (MAC) of a link layer where an Ethernet byte stream is visible, and packets are contiguous. The MDI is part of the physical medium dependent (PMD) sublayer of the PHY, and is the physical connection (e.g., connectors, pinouts, electrical characteristics, without limitation) of a device with a physical transmission medium.

As used herein, the term "Latency" means a time duration for data to travel between two reference planes, such as the MII and the MDI, without limitation. In one or more examples, a given latency value may be an approximation that was calculated, and so may not represent the exact actual time duration for data to travel between two reference planes. In one or more examples, latency may be represented in time units (e.g., picoseconds (ps), nanoseconds (ns), microseconds (μs), milliseconds (ms), without limitation) or in bit time.

At least in part due to complex PHY functions, the latency between the MII and MDI (in either direction) may change, e.g., from bit to bit, byte to byte, or symbol to symbol, without limitation. Examples of functions that introduce cyclical dynamic delays include the inclusion of FEC parity bits, or reordering of symbols, without limitation. Since the transmitted MII (TxMII) stream is reconstituted at the other end of the transmission medium as the received MII (RxMII), the sum of the dynamic delays through the transmission physical layer (Tx PHY) and reception physical layer (Rx PHY) is constant. Taking the example of FEC parity bits: adding FEC parity bits through the TxPHY delays the transmission of the bits that come after the parity bit, i.e., those bits will have higher latency through the Tx PHY than the bits immediately before the parity bits were inserted. The Rx PHY will perform the inverse operation, removing those parity bits. The bits immediately after the parity bits will thus incur less latency through the RxPHY than the bits immediately before the FEC parity bits. The near-end Tx MII to far-end Rx MII latency (the latency across the physical transmission medium) can thus be seen as constant, even if its constituent parts do not have constant latency. For this reason, merely following a packet's message timestamp point (which is typically configurable, as a non-limiting example, it is often configured as the first bit after the Start-of-Frame-Delimiter (SFD)) to the edge of a device (i.e., the MDI) is not sufficient for timestamping, as it would result in time synchronization errors due to the dynamic variation.

IEEE 802.3 specifies that for both transmit and receive data, timestamps are to be generated at the MII and adjusted with a "constant" that represents the path data delay to calculate a timestamp corresponding to the MDI reference plane (the "MDI timestamp"). In the case of the Tx PHY, the largest dynamic MII-to-MDI latency is used. In the case of the Rx PHY, the smallest dynamic MDI-to-MII latency (which also accounts for medium lane skew) is used. Thus, to measure the transmit or receive data path delay between the MII and the MDI, the transit time of a specific bit that incurs the largest (transmit) and smallest (receive) dynamic latency variation is observed. (Note that the bit that incurs the maximum transmit dynamic delay is necessarily the same bit that incurs the minimum receive dynamic delay.) The specific bit may be any bit that reliably incurs the maximum transmit latency (also called "Tx path data delay") or minimum receive latency (also called "Rx path data delay"), as the case may be. The specific bit may vary per PHY type (different rates and interfaces have different PHY functions, and thus different dynamic latencies), such as the first bit (or symbol) of a Forward Error Correction (FEC) codeword or the first bit (or symbol) of a multi-lane distribution, without limitation.

IEEE 802.3 specifies that the MII is a constant-bit-rate interface. When IEEE 802.3 devices implement IEEE 1588, for Rx the packet timestamp is when the message timestamp point of a packet crosses the Rx MII plane ("Rx MII packet timestamp") minus the constant "Rx path data delay" value that corresponds to the minimum latency through the Rx PHY. For Tx, the packet timestamp is when the message timestamp point of the packet crosses the Tx MII plane ("Tx MII packet timestamp") plus the constant "Tx path data delay" value that corresponds to the maximum latency through the Tx PHY.

In practice, MII timestamps (e.g., an Rx MII packet timestamp, a Tx MII packet timestamp, without limitation) are difficult to directly measure. The MII is a logical interface that may, but need not, exist physically, and inferring a timestamp at an MII-equivalent interface can be difficult. For example, in lieu of the MII, the physical implementation of a device may use a wide, time-division-multiplexed (TDM), or overclocked interface, but such an interface is not necessarily constant-bit rate. Thus, it is difficult to determine (e.g., detect, without limitation) when a packet's message timestamp point crosses the MII. Since the Rx and Tx packet timestamps are calculated using the RxMII and Tx MII packet timestamps, this makes it difficult to calculate the Rx and Tx packet timestamps.

Further, the latency of some or a totality of the circuitry for the PCS/FEC functions logic and any optional implementation-specific logic may, or may not, be deterministic. When the latency is not deterministic it is difficult to track the latency of a specific bit, and difficult to determine minimum Rx path data delay and maximum Tx path data delay. For example, many physical factors can affect a path delay measurement, such as on-device clock skew (on chip clock distribution), data propagation delays (including the contribution of source-sync paths), clock-domain crossings, and other structures such as FIFOs and gearboxes, all of whose dynamic latencies are often a function of non-deterministic startup conditions and of process/voltage/temperature (PVT) conditions. Measuring the path delays a priori by counting pipelines or measuring propagation delays in Static Timing Analysis (STA) may result in larger-than-targeted timestamp uncertainty.

Further still, perfect synchronization or distribution of the Time-of-Day between either end of the path data delay measurement is, typically, not possible or too expensive to be practical. The calculation of any latency is end-time minus start-time. Any such latency measurement will thus suffer from the inaccuracy from having two-time measurements (end time and start time), and due to any difference in the wall time (a time according to a local time source) at those two measurement points. So, calculations of the Rx path data delay and Tx path data delay may incur additional error due to time difference at either end of any direct measurement.

Overall, obtaining accurate packet timestamps presents significant challenges, especially if the standard-specified method of obtaining an MII packet timestamp and adjusting for the path data delay is used literally. The MII packet timestamp may be inaccurate because for many implementations, the MII generally does not exist physically. A pre-determined path data delay value may be inaccurate because the PHY latency may be non-deterministic. A measured path data delay value may be inaccurate because of the dynamic latency variation through the PHY, and due to the difficulty synchronizing the clock at either end of the measurement, and due to the fact that two time samples are needed to calculate that latency.

To perform SerDes timestamping, the timestamping function at the SerDes should be initiated in response to detection of a predetermined bit of incoming or outgoing data.

One or more examples relate, generally, to adding an indication to the incoming or outgoing data, where the indication identifies a bit (or a byte or symbol) in the data, the "indicated bit location." The indication marks a bit location of the outgoing or incoming data. Indicated bit locations may be observed at the parallel interface of the SerDes by a bit detector that, in response to detecting an indicated bit location, triggers hardware timestamps to generate the SerDes timestamps.

Packet Timestamp calculation Utilizing a SerDes Specific Bit Timestamp

Instead of measuring path data delays and generating a timestamp when a message timestamp point crosses an MII that may or may not physically exist, the inventors of this disclosure appreciate it is easier to generate a timestamp close to or within the device edge—i.e., when a specific bit representative of the path data delay crosses a SerDes interface, which is close to the MDI—and calculate a packet timestamp at least partially based thereon.

In the case of incoming data, the specific bit utilized to timestamp a crossing at a SerDes is referred to herein as the "Rx SerDes Specific bit," and a timestamp based thereon is referred to a "Rx SerDes specific bit timestamp." In the case of outgoing data, the specific bit utilized to timestamp a crossing at a SerDes interface is referred to herein as the "Tx SerDes specific bit," and a timestamp based thereon is referred to as a "Tx SerDes specific bit timestamp."

In the case of incoming data, the point in a packet utilized to timestamp a crossing at an MII is referred to herein as a "message timestamp point," and a timestamp based thereon is referred to as a "packet timestamp." In the case of incoming data, the packet timestamp is referred to as the "Rx packet timestamp," and in the case of outgoing data, the packet timestamp is referred to as the "Tx packet time-stamp."

The Rx packet timestamp=Rx MII packet timestamp−Rx path data delay, and Tx packet timestamp=Tx MII packet timestamp+Tx path data delay.

The Rx packet timestamps and Tx packet timestamps represent a sum or difference, respectively, where the MII packet timestamp term cancels out in the calculation, as discussed below. Further, since the MII is logically a constant-bit-rate interface, the MII packet timestamp of bit x+n may be calculated as: (MII packet timestamp of bit x+n)=(MII packet timestamp of bit x)+(n*MII bit time), where the variables "x" and "n" are integers≥1.

Further equivalencies may be deduced for calculating a Tx packet timestamp and a Rx packet timestamp when the Rx SerDes Specific Bit timestamp and the Tx SerDes specific bit timestamp are available parameters.

Tx Packet Timestamp:

Tx packet timestamp=(Tx MII packet timestamp)+(Tx path data delay); (Equation 1).

Tx path data delay=(Tx SerDes Specific bit timestamp)−(Tx MII specific bit timestamp) (Equation 2).

Where Tx MII specific bit timestamp is the time when the Tx SerDes specific bit crosses the MII.

Tx packet timestamp=(Tx MII packet timestamp)+((Tx SerDes specific bit timestamp)−(Tx MII specific bit timestamp)) (Equation 3).

Since the Tx MII is a constant-bit-rate interface: Tx packet timestamp=(Tx MII specific bit timestamp)+(Tx MII bit distance)*(MII bit time) (Equation 4), where Tx MII bit distance is the distance (in bits) between the message timestamp point and where the Tx SerDes specific bit appears on the MII.

Tx packet timestamp=((Tx MII specific bit timestamp)+(Tx MII bit distance)*(MII bit time))+(Tx SerDes specific bit timestamp)−(Tx MII specific bit timestamp)) (Equation 5).

The Tx MII specific bit timestamp parameters cancel out in Equation 5. Thus, the Tx packet timestamp may be expressed as a function of the Tx SerDes specific bit timestamp, the Tx MII bit distance, and the MII bit time as follows:

Tx packet timestamp=(Tx SerDes specific bit timestamp)+(Tx MII bit distance)*(MII bit time)), (Equation 6).

Rx Packet Timestamp:

Rx packet timestamp=(Rx MII packet timestamp)−(Rx path data delay) (Equation 7).

Rx path data delay=(Rx MII specific bit timestamp)−(Rx SerDes specific bit timestamp) (Equation 8).

Where Rx MII specific bit timestamp is the time when the Rx SerDes specific bit crosses the MII.

Rx packet timestamp=Rx MII packet timestamp−((Rx MII specific bit timestamp)−(Rx SerDes specific bit timestamp)) (Equation 9).

Since the Rx MII is a constant-bit-rate interface: Rx MII packet timestamp=Rx MII specific bit timestamp+(Rx MII bit distance)*(MII bit time) (Equation 10).

Where Rx MII bit distance is the distance (in bits) between the message timestamp point and Rx SerDes specific bit.

Rx packet timestamp=((Rx MII specific bit timestamp)+(Rx MII bit distance)*(MII bit time))−((Rx MII specific bit timestamp)−(Rx SerDes specific bit timestamp)) (Equation 11).

The Rx MII specific bit timestamp parameters cancel out in Equation 11. The Rx packet timestamp can thus be expressed as a function of the Rx SerDes specific bit timestamp, the Rx MII bit distance, and the MII bit time, as follows:

Rx packet timestamp=(Rx SerDes specific bit timestamp)+$n$*(MII bit time)), (Equation 12)

where n=is the Rx MII bit distance from the specific bit to the message timestamp point of the packet.

The final equivalent expressions for the Tx packet timestamp and the Rx packet timestamp, above, both are functions of the SerDes specific bit timestamps. The Rx packet timestamp and Tx packet timestamp may be calculated. No direct measurement of path data delay is utilized, nor is an MII timestamp required. The Tx packet timestamp and Rx packet timestamp may be based on timestamps generated solely at the edge of the device, e.g., the SerDes.

Timestamping Frequency or Interval

The higher the frequency of the SerDes timestamping, the more quickly timestamp errors may be detected, latency effects of process voltage/temperature changes may be corrected, and the effect of bit time inaccuracies may be mitigated, without limitation. In effect, by regularly recalculating the SerDes specific bit timestamp, and restarting "n" at zero, the absolute timestamp error due to an inaccurate MII bit time is bounded. To use an analogy, a wristwatch could be synchronized to the exact time—at noon on Sunday. If the watch runs 0.01% too fast, then by next Sunday at noon, the watch would be more than a minute off. But if the watch is synchronized every day at noon, then its time will never have more than 10 seconds of error. The more often the watch is synchronized, the smaller the time error due to frequency inaccuracy will be.

To obtain values for the Tx SerDes specific bit timestamp and the Rx SerDes specific bit timestamp, it is desirable to perform SerDes timestamping regularly, for both single- and multi-lane channels (multi-lane is discussed below). The specific bits may occur only once per FEC word or per multilane distribution, though other frequencies of occurrence do not exceed the scope of this disclosure. Since the timestamp equations use the MII bit time, any inaccuracy in that MII bit time value will impair the timestamp the farther away the packet is from the specific MII bit: timestamp error=n*(MII bit time error).

The Specific Bits

The locations of specific bits are utilized for Tx and Rx SerDes specific bit timestamping, as discussed below. The locations of the specific bits should be indicated for a totality of the path between the MII and the SerDes, including through any PCS/FEC/PMA functions. Further, in the case of multilane, instances of the indications should be present for each physical SerDes lane.

By way of non-limiting example for Tx, the Tx SerDes specific bit is indicated at the Tx PCS and then is carried with the outgoing data on the Tx path of the PHY toward the SerDes where it is timestamped to generate the Tx SerDes specific bit timestamp. As a non-limiting example, when FEC parity bits are inserted in the Tx PCS/FEC block, the bit immediately after the FEC parity bits have the largest MII-to-MDI delay. Through the Tx PCS/FEC blocks, therefore, the specific bit can be determined, as well as its position on the MII.

By way of non-limiting example for Rx, prior to framing at the PCS, it may be difficult or impossible to detect individual bits, including the Rx SerDes specific bit, in the incoming data without complex circuits, which itself has a latency that could make overall latency calculations difficult. Through the Rx PCS/FEC blocks, the specific bits representative of the Rx path data delay are determined. As a non-limiting example, for channels with FEC, the bit immediately following the FEC parity bits has the smallest Rx path data delay. As the Rx PCS/FEC blocks frame to and remove the FEC parity bits, the specific bit location in the data from the Rx SerDes, as well as the corresponding bit position in the Rx MII are determined.

In one or more examples, for Rx SerDes specific bit timestamping, a location of an arbitrary bit (referred to herein as the "Rx SerDes arbitrary bit") is indicated and timestamped at the SerDes to generate a Rx SerDes arbitrary bit timestamp. The bit distance between the Rx SerDes arbitrary bit and a Rx SerDes specific bit is calculated (the "arbitrary-to-specific SerDes bit distance"), and the timestamp (Rx SerDes specific bit timestamp) for the Rx SerDes specific bit is calculated as discussed below.

By way of non-limiting example where the Rx SerDes specific bit is a FEC codeword boundary: by detecting FEC codeword boundaries, the bit distance (e.g., in bits or bit time, without limitation) between an arbitrary bit and the beginning of the FEC codeword may be measured. The Rx SerDes specific bit timestamp (representative of the Rx path data delay) at the beginning of the FEC codeword is a function of a Rx SerDes arbitrary bit timestamp and the time to the Rx SerDes specific bit:

Rx SerDes specific bit timestamp=(Rx SerDes arbitrary bit timestamp)+(arbitrary-to-specific SerDes bit distance)*(SerDes bit time) (Equation 13).

Substituting Equation 13 into Equation 12, the Rx packet timestamp may be calculated as a function of the Rx SerDes arbitrary bit timestamp and the arbitrary-to-specific SerDes bit distance on the SerDes:

Rx packet timestamp=(Rx SerDes arbitrary bit timestamp)+(arbitrary-to-specific SerDes bit distance)*(SerDes Bit time)+Rx MII bit distance*(MII bit time)) (Equation 14).

Timestamping in Multilane Operation

"Multilane" refers to the utilization of multiple data paths ("lanes") to transmit data concurrently over a physical transmission medium. Use of multiple lanes, as a non-limiting example, allows for higher total data rates without increasing the data rate required of respective lanes.

Skew may occur across multiple physical lanes of a SerDes interface. Since respective lanes are physically independent from the other lanes, respective lanes may have a different latency, either on the device, or across the physical medium, then the other lanes. As such, the respective lanes may depart (Tx) or arrive (Rx) in a staggered fashion. To calculate the Rx and Tx timestamps, the skew, i.e., the relative latency of each physical lane, is considered in order to properly model the path data delay. Stated differently, the maximum MII-to-MDI latency (Tx) and minimum MDI-to-MII latency (Rx) will vary per lane, so any SerDes-timestamping of the specific bit position representative of path data delay requires determining which lane is the last-departing (Tx) or last-arriving (Rx).

For multilane channels, instead of a single specific bit being flagged, the specific bit representative of the path data delay can map to a set of specific bits such that there is one specific bit per physical lane. Each set of specific bits, one per lane, is generated/determined such that if there is zero lane skew, then the specific bits for all the parallel lanes would all depart (Tx) or arrive (Rx) at the device boundary simultaneously. Within the PHY circuitry, how to perform the 1-to-many specific bit conversion depends on the specific PHY functions and is thus an implementation detail.

In the Tx direction, in the presence of Tx lane skew, it is desirable to use the last departing lane, which represents the maximum MII-to-MDI latency, to calculate the Tx path data delay. For each SerDes lane, the periodic specific bit is flagged for SerDes timestamping. If there is zero lane skew, then the flagged bits for each lane would all arrive at the SerDes at exactly the same time, i.e., have the same SerDes specific bit timestamp. But with lane skew, the indicated bit locations may arrive staggered at the Tx SerDes. The last departing lane has the latest Tx SerDes specific bit timestamp value.

The expression for Tx packet timestamp for a multilane interface is thus:

Tx packet timestamp=last(Tx SerDes specific bit timestamp per SerDes lane)+(Tx MII Bit distance)*(MII bit time) (Equation 15), where "last" refers to the last-departing lane (i.e., the latest timestamp value among all the lanes, which is equivalent to the last specific bit to appear at the SerDes), and n is the bit distance from the specific bit representative of the Tx path data delay to a message timestamp point used for the Tx packet.

For Rx multilane channels, the skew present at the SerDes lanes is that of the medium. The RxPHY performs a deskew function to re-align the lanes and recover the MII channel. Since the Rx path data delay is the minimum MDI-to-MII latency, the last-arriving lane is used for the Rx SerDes specific bit timestamp, and ultimately to calculate the packet timestamp. To identify the last-arriving lane, the single lane approach is extended to multiple lanes. For each SerDes lane, an arbitrary bit is timestamped and flagged, and through the Rx PHY, the SerDes bit distance from the arbitrary bit to the specific bit representative of the Rx path data delay is computed for each lane Like for a single-lane channel, the periodic "specific bit timestamp" for each lane is the periodic arbitrary bit timestamp adjusted by the time distance to the Rx SerDes specific bit timestamp. Due to the use of the SerDes arbitrary bit on each lane, in combination with skew between the lanes, care is taken to adjust to a common, aligned set of specific bits (and not the next set of common bits). For this reason, the minimum interval of the arbitrary bit-SerDes timestamping is a function of the maximum possible lane skew. Otherwise, it might not align to the same set of Rx specific bits, and the specific bit timestamps could be off by an entire specific bit interval.

The expression for Rx packet timestamp for a multilane interface is thus:

Rx packet timestamp=last[(Rx SerDes arbitrary bit timestamp per SerDes lane)+$k_i$*(SerDes bit time)]+$n$*(MII bit time) (Equation 16)

where "last" refers to the last-arriving lane (i.e., the last "specific bit" to appear at the Rx SerDes, calculated after each lane's arbitrary-to-specific adjustment), $k_i$ is the arbitrary-to-specific SerDes bit distance for SerDes lane i (note that $k_i$ may be positive or negative so that the lanes align to a common set of specific bits), and n is the Rx MII bit distance.

After the above arithmetic manipulation, the Tx packet timestamp and the Rx packet timestamp:

Are a function of the Rx SerDes specific bit timestamp (for the last-arriving lane in the case of multilane), and the Tx SerDes Specific bit timestamp (for the last-departing lane in the case of multilane)

The Rx SerDes specific bit timestamp may be expressed as Rx SerDes specific bit timestamp=(Rx SerDes arbitrary bit timestamp)+(an Rx adjustment value). The Rx adjustment value=(arbitrary-to-specific SerDes bit distance)*(SerDes bit time)

The Tx MII bit distance and the Rx MII bit distance between the specific timestamp bit and a packets message timestamp point The MII bit time and SerDes bit time The following parameters are not required (or are optional) to calculate Tx packet timestamp or Rx packet timestamp:

A direct measurement of Tx or Rx path data delay

An MII timestamp function (only a SerDes timestamp function is utilized)

Time-of-Day synchronization or distribution between SerDes and MII (only the SerDes Time-of-Day is utilized)

Values for the MII bit time and SerDes bit time may be predetermined, or measured over a given interval if more precise values are required. The arbitrary-to-specific SerDes bit distance, Tx MII bit distance, Rx MII bit distance, and Rx adjustment value may be calculated. Notably, on-device latencies do not need to be determined, measured, or otherwise known to perform the aforementioned calculations.

One or more examples relate, generally, to logical timestamping and logical timestamping functionality at a SerDes provided at a physical layer.

Instead of timestamping at the MII and adjusting for data path latency between the MII and the MDI, indicated bit locations at the parallel interface of the SerDes are timestamped. In the case of multilane, per-SerDes-lane timestamping of indicated bit locations is performed. SerDes timestamping of the indicated bit locations is performed directly at the SerDes parallel interfaces. No attempt to measure, infer, or calculate a Rx path data delay or Tx path data delay is required.

Using the SerDes indicated bit location timestamps, SerDes specific bit timestamps may be derived and an arrival/departure time of a packet at the MDI reference plane may be calculated based on the specific bit timestamps, the bit distance from a specific bit to the message timestamp point, and the SerDes bit time.

In multilane, Rx skew over the medium may be corrected by timestamping with respect to the last-arriving lane, and Tx skew within the PHY may be corrected by timestamping with respect to the last-departing lane.

Since flagged bit timestamps are generated with respect to the edge of the device—i.e., the parallel interface of the SerDes (missing only the latency of the SerDes itself, which can be applied post facto), no device latencies are measured, inferred or calculated.

FIG. 1 is a block diagram depicting an apparatus 100 for SerDes timestamping of indicated bit locations, in accordance with one or more examples.

The apparatus 100 includes a PHY portion 102, a SerDes 108 having a parallel interface 110, a bit location detector 112, and a timestamp logic circuit 114. The PHY portion 102 includes a logic circuit 104 and an adjustment value 106.

SerDes 108 is a pair of functional blocks, namely, a Serializer and a Deserializer. The serializer of SerDes 108 takes parallel data on inputs of the parallel interface 110, combines them, and outputs the data serially (one bit at a time) on a single data line or outputs portions of the data, serially, on multiple respective lanes. The Deserializer of SerDes 108 takes a serialized data stream on input (a single data line or multiple lanes), converts it into parallel data, and places the parallel data on outputs of parallel interface 110, as incoming data 126. Parallel interface 110 of SerDes 108 includes an input/output (I/O) for receiving and sending parallel data. Parallel interface 110 receives parallel outgoing data 128 from PHY portion 102 and sends parallel incoming data 126 to PHY portion 102. In one or more examples, SerDes 108 may co-located with PHY portion 102 or may not be co-located with PHY portion 102, depending on specific operating conditions.

Bit location detector 112 receives incoming data 126 or outgoing data 128 from parallel interface 110 of SerDes 108 and detects (e.g., via data processing, pattern matching, or a combination thereof, without limitation) indicated bit location 116. In response to detecting indicated bit location 116, bit location detector 112 generates trigger 118 to initiate timestamp logic circuit 114 to generate SerDes specific bit timestamp 122. In one or more examples, SerDes specific bit timestamp 122 may be a hardware timestamp or a timestamp calculated at least partially based on a hardware timestamp. Hardware timestamps are time markers applied directly by a hardware device. Hardware timestamps are typically more accurate than software timestamps (e.g., avoids delay and variability in software timestamps, without limitation). Further, hardware timestamps enjoy greater flexibility on where (i.e., physical location) they can be applied than a software timestamp. In one or more examples, a SerDes specific bit timestamp 122 may be or include a Tx SerDes specific bit timestamp or a Rx SerDes specific bit timestamp.

PHY portion 102 is at least a portion of a physical layer of a device and may include circuitry for Tx and Rx PHY functions. PHY portion 102 is coupled with a MAC by PHY/MAC interface or equivalent 120.

Logic circuit 104 is provided at PHY portion 102. Logic circuit 104 receives SerDes specific bit timestamps 122 from timestamp logic circuit 114 and generates packet timestamp 124 at least partially based thereon. Packet timestamp 124 may be a Rx packet timestamp or a Tx packet timestamp, as the case may be. In one or more examples, logic circuit 104 may generate a packet timestamp 124 by combining a SerDes specific bit timestamp 122 with adjustment value 106.

Generally speaking, adjustment value 106 represents an MII distance (e.g., in time, without limitation) between the location of a SerDes specific bit (that is representative of the path data delay) and the message timestamp point of the incoming or outgoing data to be timestamped.

In the case of Rx path data delay, initially, a location of an arbitrary bit of the incoming data is utilized to generate SerDes specific bit timestamp 122, so the SerDes specific bit timestamp 122 is the Rx SerDes arbitrary bit timestamp. The Rx SerDes specific bit timestamp is calculated at least partially based on the bit distance between the location of the Rx SerDes arbitrary bit and the Rx SerDes specific bit multiplied by the SerDes bit time. Logic circuit 104 may set the adjustment value 106 equal to the product of the arbitrary-to-specific SerDes bit distance multiplied by the SerDes bit time.

In one or more examples, determines which bit is representative of the Tx path data delay (e.g., the specific bit), and determines its position *both* on the MII side and on the SerDes side (referred to herein as the SerDes specific bit).

Figure 2:
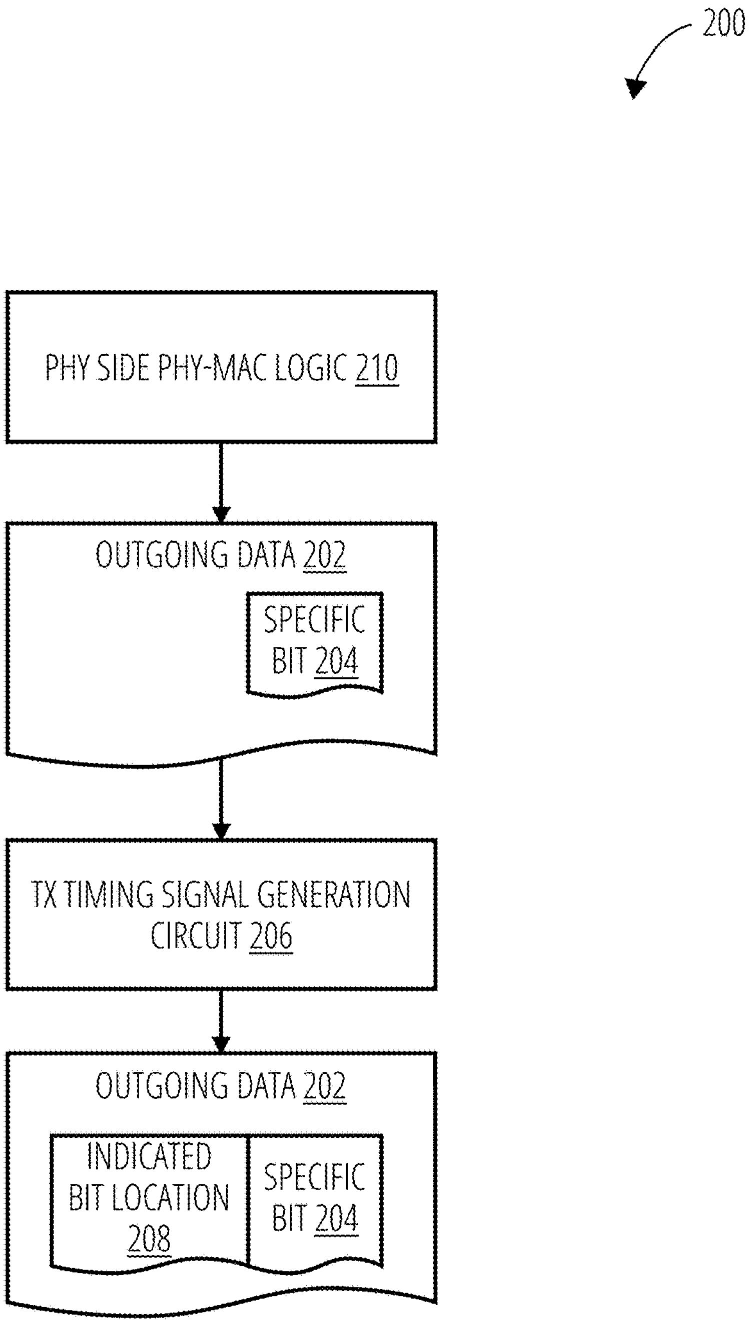
FIG. 2 is a block diagram depicting an apparatus for adding an indicated bit location to outgoing data, in accordance with one or more examples.

FIG. 2 is a block diagram depicting an apparatus 200 for indicating a bit location of a specific bit in outgoing data, in accordance with one or more examples. Apparatus 200 may be, as a non-limiting example, provided in PHY portion 102 or adjacent, and coupled to, PHY portion 102 so that it receives copies of outgoing data.

Apparatus 200 includes a Tx timing signal generation circuit 206 and an optional PHY side PHY-MAC logic 210.

PHY side PHY-MAC logic 210 is a logic circuit that implements the PHY side functions of a PHY/MAC interface or equivalent 120, such as an MII or MII equivalent, without limitation.

Tx timing signal generation circuit 206 is a logic circuit (a same or different logic circuit than logic circuit 104) that receives outgoing data, detects that a bit of the outgoing data corresponds to a Tx SerDes specific bit, and adds an indication to the outgoing data to indicate the location of the Tx SerDes specific bit.

Here, Tx timing signal generation circuit 206 receives outgoing data 202 (or a copy thereof) that includes specific bit 204, processes outgoing data 202 (or a copy thereof) and indicates a location of specific bit 204 (the indicated bit location 208) in outgoing data 202 at least partially based thereon.

In one or more examples, Tx timing signal generation circuit 206 determines, based on the TxPHY function, which specific bit is representative of the Tx path data delay, processes outgoing data 202 (or a copy thereof) and indicates a location of the specific bit 204 (the indicated bit location 208) in outgoing data 202 at least partially based thereon.

Here, Tx timing signal generation circuit 206 receives outgoing data 202 including specific bit 204 directly from PHY side PHY-MAC logic 210, and specific bit 204 is a bit that is visible at PHY side PHY-MAC logic 210. As non-limiting examples, specific bit 204 may be a bit adjacent to a start-of-frame delimiter (SFD) or an alignment marker or FEC word. In one or more examples, specific bit 204 may be a periodic bit—i.e., a bit that is reliably present in the outgoing data 202 according to a consistent periodicity.

In one or more examples, Tx timing signal generation circuit 206 adds an indication for a location of specific bit 204 of outgoing data 202 to indicate that the bit at that location (specific bit 204), is being used as the Tx SerDes specific bit.

In one or more examples, the indication may be added to a portion of outgoing data 202 suitable to hold holding out-of-band data, such as a vendor-specific element or side-band bit. In one or more examples, the indication may be added to a further data path or auxiliary data path for carrying information about outgoing data and bits thereof.

Figure 3:
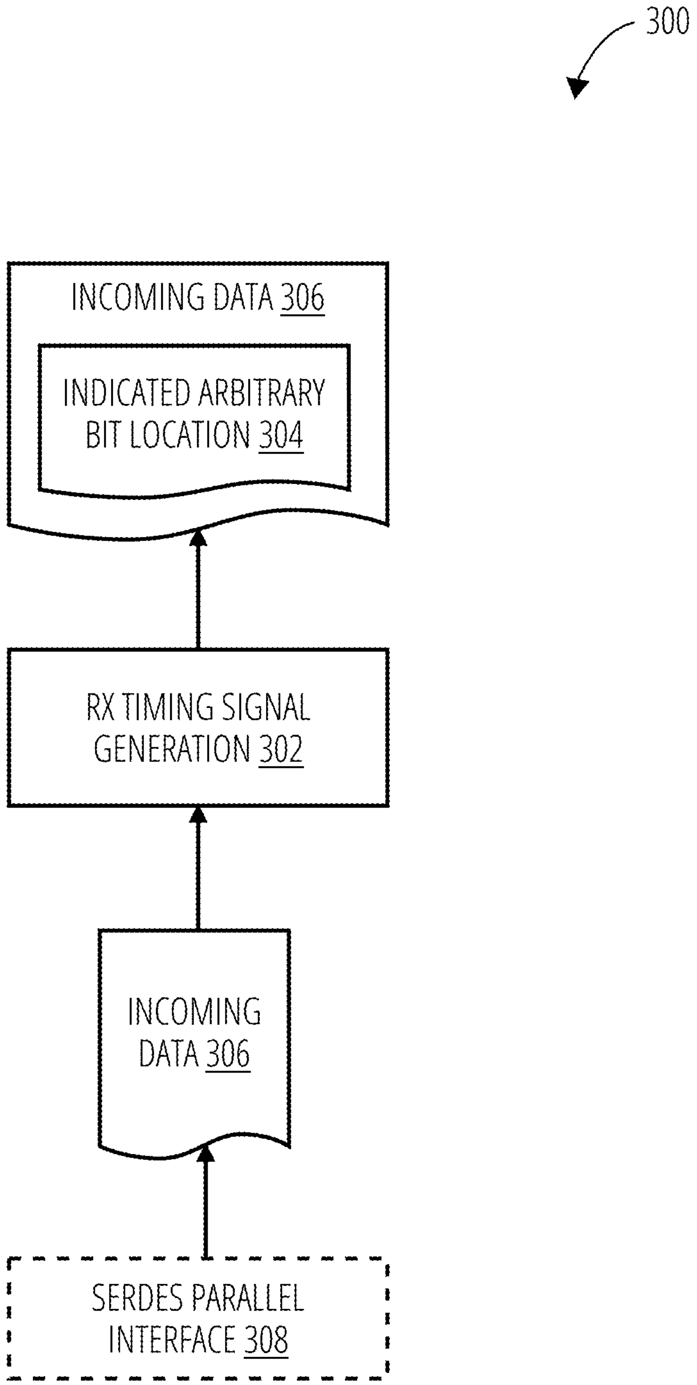
FIG. 3 is a block diagram depicting an apparatus for adding an indicated bit location to incoming data, in accordance with one or more examples.

FIG. 3 is a block diagram depicting an apparatus 300 for indicating a bit location at incoming data, in accordance with one or more examples. Apparatus 300 may be, as a non-limiting example, provided at PHY portion 102 or adjacent and coupled to PHY portion 102 so that it receives copies of incoming data from a parallel interface of a SerDes.

Apparatus 300 includes an RX timing signal generation 302 and an optional SerDes Parallel interface 308.

SerDes Parallel interface 308 is the parallel interface of a SerDes such as SerDes 108 of FIG. 1. SerDes Parallel interface 308 is the input/output interface where data is exchanged in parallel form between SerDes 108 and a connected device or system (e.g., processors, memories, other communication devices, system buses, without limitation). SerDes Parallel interface 308 may include, for example, one or more parallel data lines, control lines, and clock lines. The configuration of SerDes Parallel interface 308 will vary depending on the specific implementation and requirements of SerDes 108.

RX timing signal generation 302 is a logic circuit that receives incoming data 306 (or a copy thereof) from SerDes Parallel interface 308, processes incoming data 306 (or copy thereof), and indicates a location in the incoming data 306 of a bit being used as an Rx SerDes arbitrary bit (such a location referred to herein as an "indicated arbitrary bit location"). The indication to indicated arbitrary bit location 304 is provided with incoming data 126.

The Rx SerDes arbitrary bit location 304 may be chosen without regards to the content of the incoming data. In one or more examples, specific bit location 304 may be a periodic bit—i.e., a bit that is reliably present in the incoming data 306 according to a consistent periodicity.

The indicated arbitrary bit location 304 may be utilized to determine a location for a Rx SerDes specific bit, as discussed below.

Figure 4:
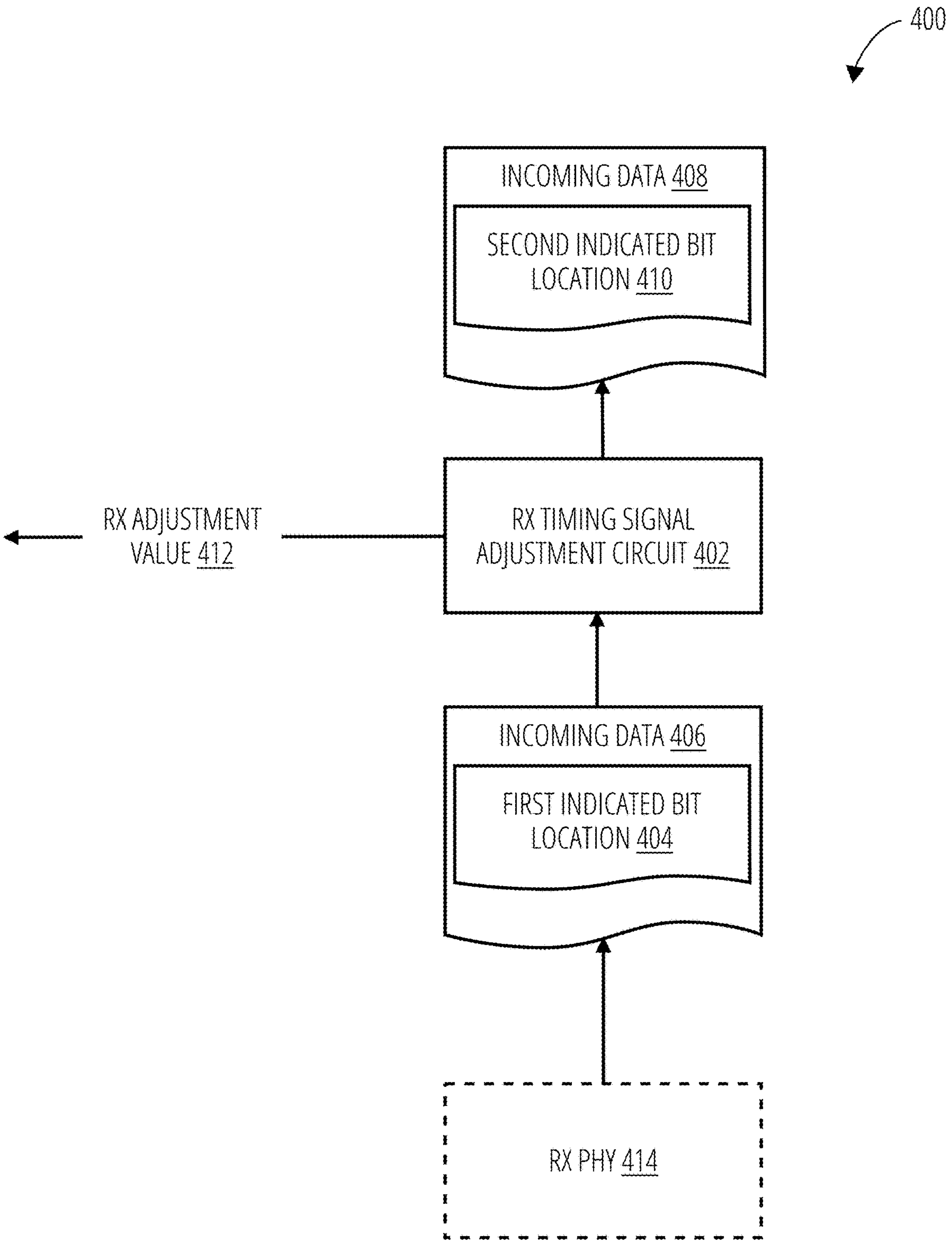
FIG. 4 is a block diagram depicting an apparatus for changing an indication in the incoming data from an arbitrary bit to a specific bit, in accordance with one or more examples.

FIG. 4 is a block diagram depicting an apparatus 400 for changing an indication in the incoming data from the location of an Rx SerDes arbitrary bit to the location of a Rx SerDes specific bit, in accordance with one or more examples.

Apparatus 400 includes Rx signal timing adjustment circuit 402.

Rx signal timing adjustment circuit 402 is a logic circuit (the same or different logic circuit as PHY portion 102 of FIG. 1) that receives from Rx PHY 414, incoming data 406 with first indicated bit location 404, and provides second indicated bit location 410 with incoming data 408.

First indicated bit location 404 is the location of a Rx SerDes arbitrary bit. Second indicated bit location 410 is the location of a Rx SerDes specific bit. Since incoming data 406 is received at Rx signal timing adjustment circuit 402 post-framing, the Rx SerDes specific bit can be detected, and an indication moved to indicate a location of the Rx SerDes specific bit. Here, "moving" the indication may include deleting the previous indication and adding a new indication to the location of the Rx SerDes specific bit. Rx signal timing adjustment circuit 402 changes the indication in incoming data 406 from first indicated bit location 404 to a second indicated bit location 410.

The Rx SerDes arbitrary bit timestamp was associated with the location of the Rx SerDes arbitrary bit. So, Rx signal timing adjustment circuit 402 calculates arbitrary-to-specific SerDes bit distance as the bit distance between first indicated bit location 404 and second indicated bit location 410.

The arbitrary-to-specific SerDes bit distance may be used by Rx signal timing adjustment circuit 402 to calculate a Rx adjustment value 412 by multiplying the arbitrary-to-specific SerDes bit distance by the SerDes bit time, as discussed, above. The Rx adjustment value 412 e may be combined with the Rx SerDes arbitrary bit timestamp to generate a Rx SerDes specific bit timestamp that corresponds to second indicated bit location 410, i.e., the location of the Rx SerDes specific bit.

Figure 5:
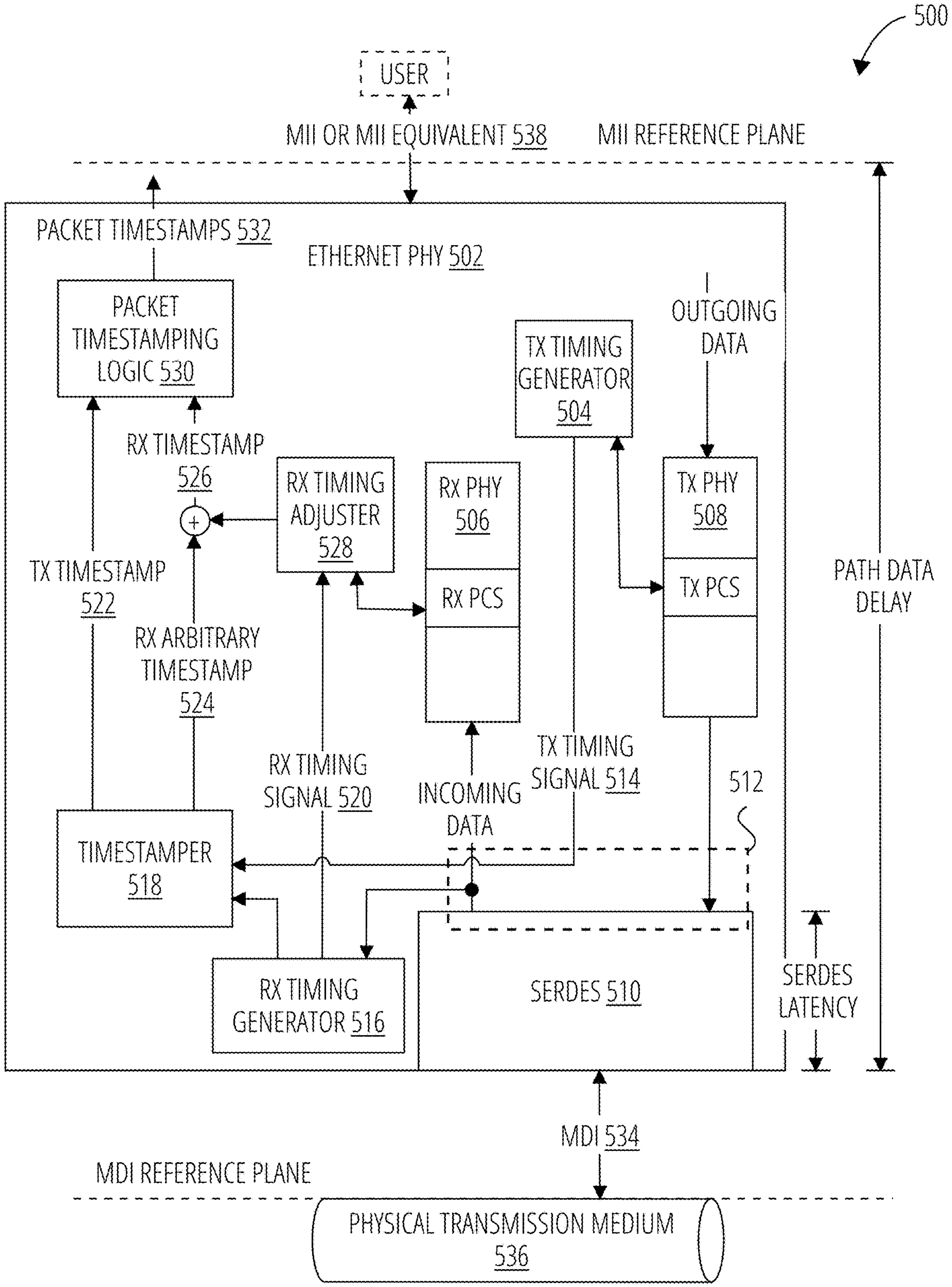
FIG. 5 is a schematic block diagram of a system in accordance with one or more examples.

FIG. 5 is a block diagram of a system 500 in accordance with one or more examples. Respective timing signals are provided at the Tx and Rx data paths, as discussed below, to indicate when bit locations of specific bits of outgoing and incoming data cross the parallel interface of the SerDes.

System 500 includes an Ethernet PHY 502 and a physical transmission medium 536. Ethernet PHY 502 and physical transmission medium 536 are coupled via MDI 534. Ethernet PHY 502 includes a Tx timing generator 504, a Rx PHY 506, a Tx PHY 508, a SerDes 510, a parallel interface 512, an RX timing generator 516, a timestamper 518, a Rx timing adjuster 528, a packet timestamping logic 530, a packet timestamps 532, an MDI 534, a physical transmission medium 536.

Tx timing generator 504 is a logic circuit receives a copy of outgoing data from the Tx PCS block of Tx PHY 508 and generates Tx timing signal 514 to indicate a bit location of a bit in the outgoing data being used as specific bit, and to indicate when that bit location is present at the parallel interface 512 of SerDes 510. In one or more examples, Tx timing generator 504 determines the specific bit representative of the Tx path data delay based on a predetermined bit (e.g., first bit of an alignment marker of an FEC block word, start-of-frame delimiter (SFD), without limitation), or the state of the TxPHY, without limitation.

RX timing generator 516 is a logic circuit that receives a copy of incoming data from the parallel interface 512 of SerDes 510 (after deserialization by SerDes 510) and generates Rx timing signal 520 to indicate a bit location of a bit of the incoming data being used as a temporary specific bit as discussed above. In one or more examples, any bit of the incoming data may be chosen as the temporary specific bit as long as its presence is maintained for a totality of the Rx PHY data path.

In one or more examples, Tx timing signal 514 and Rx timing signal 520 are metadata provided via a further or an auxiliary data path that is a different (e.g., separate and distinct from, without limitation) data path than the Tx PHY data path or Rx PHY, but exhibits the same timing as the Tx PHY and Rx PHY data paths, and can be used to carry information about incoming and outgoing data and specific portions and bits thereof.

The Tx PCS of Tx PHY 508 and Rx PCS of Rx PHY 506 implement the functions of a Tx PCS sublayer and Rx PCS sublayer of Ethernet PHY 502. Tx PCS may be responsible for encoding, encrypting and forward error correcting (FEC). Rx PCS may be responsible for decoding, decrypting, and forward error correcting. Encoding converts outgoing data to a form suitable for transmission over physical transmission medium 536, as non-limiting examples for standardization, speed, security, or compatibility. Decoding reconstructs the incoming data to the form it was in before it was encoded by the sender. Encrypting and decrypting involves converting data of a data stream into a code to prevent unauthorized access to ensure security and privacy and converting the code back into the data. Forward error correcting adds correction codes to the data stream that allow a receiver to detect and correct a limited number of errors without needing retransmission.

While only PCS function blocks (i.e., Tx PCS and Rx PCS) are depicted in FIG. 5, that is merely to avoid cluttering FIG. 5 and is not intended to be limiting in any way. Additional functions may be implemented at Tx PHY 508 and Rx PHY 506 without exceeding the scope of this disclosure, such as a PMA sublayer or a PMD sublayer, without limitation.

SerDes 510 performs bit-level serialization/deserialization if outgoing data and incoming data.

Timestamper 518 is a hardware timestamper that generates timestamps in response to specific events or signals. A timestamp is a value that represent a specific point in time. In one or more examples, timestamps generated by timestamper 518 may be provided individually, or included in a log, a record, or a metadata, without limitation.

Here, timestamper 518 performs timestamping when bit locations of time stamp bits of outgoing data are present at parallel interface 110 of SerDes 510 as indicated by Tx timing signal 514, and when bit locations of temporary specific bits of incoming data are present at parallel interface 110 of SerDes 510 as indicated by Rx timing signal 520. More specifically, timestamper 518 generates Tx SerDes Specific bit timestamp 522, which indicates when a specific bit of outgoing data was present at parallel interface 512 of SerDes 510, and generates Rx arbitrary timestamp 524, which indicates when a temporary specific bit of incoming data was present at parallel interface 512 of SerDes 510.

In one or more examples, timestamper 518 includes s a Time-of-Day source to provide the time information that can be included in Tx SerDes Specific bit timestamp 522 and Rx arbitrary timestamp 524 and a signal detector to detect Tx timing signal 514 and Rx timing signal 520. In one or more examples, timestamper 518 and its Time-of-Day source are maintained at or near parallel interface 512 of SerDes 510, and not deep within the core of the device or near MII or MII equivalent 538.

Rx timing adjuster 528 is a logic circuit that receives, post-framing, incoming data including an indicated arbitrary bit, detects a bit that corresponds to a Rx SerDes specific bit, and changes the indication from the location of the arbitrary bit (the first indicated bit location) to the location of the Rx SerDes specific bit (the "second indicated bit location"). Rx timing adjuster 528 calculates the bit distance between the arbitrary bit and the Rx SerDes 108 (the arbitrary-to-specific SerDes bit distance) and multiplies it by the SerDes bit time to generate the Rx adjustment value, which is combined with Rx arbitrary timestamp 524 to generate Rx SerDes specific bit timestamp 526 (i.e., a Rx SerDes specific bit timestamp).

Packet timestamping logic 530 is a logic circuit that receives SerDes specific bit timestamps (here, Tx SerDes Specific bit timestamp 522 ("Tx timestamp 522") and Rx SerDes specific bit timestamp 526 ("Rx timestamp 526")) and calculates packet timestamps 532 (here Rx packet timestamps and Tx packet timestamps). In one or more examples, packet timestamping logic 530 calculates Tx packet timestamp based on the expression: Tx packet timestamp=last (Tx SerDes specific bit timestamp (per SerDes lane))+((Tx MII bit distance)*(MII bit time)). In one or more examples, packet timestamping logic 530 calculates the Rx packet timestamp based on the expression: Rx packet timestamp=last (Rx SerDes specific bit timestamp (per SerDes lane))+(Rx MII bit distance)*(MII bit time)). The packet timestamps 532 calculated by packet timestamping logic 530 are output from Ethernet PHY 502, optionally via MII or MII equivalent 538.

In one or more examples, values for SerDes bit time, and MII bit time may be pre-calculated (e.g., during setup of a device that includes system 500, without limitation) and stored at Rx timing adjuster 528 or packet timestamping logic 530, respectively.

Figure 6:
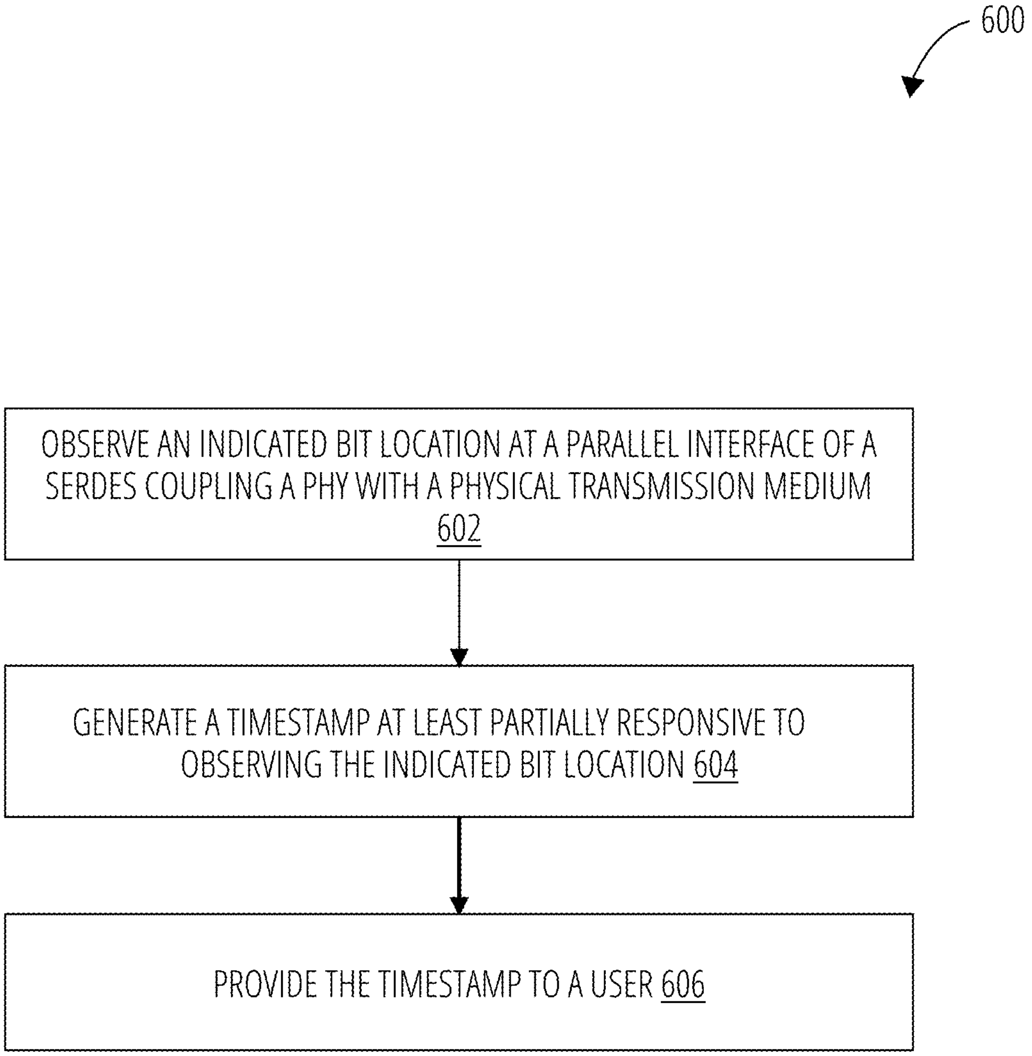
FIG. 6 is a flow-diagram depicting a process for SerDes timestamping of indicated bit locations, in accordance with one or more examples.

FIG. 6 is a flow-diagram depicting a process 600 for SerDes timestamping of indicated bit locations of outgoing data or incoming at a PHY, in accordance with one or more examples. Some or a totality of operations of process 600 may be performed, as non-limiting examples, by apparatus 100 or system 500.

Although the example process 600 depicts a particular sequence of operations, the sequence may be altered without departing from the scope of the present disclosure. For example, some of the operations depicted may be performed in parallel or in a different sequence that does not materially affect the function of process 600. In other examples, different components of an example device or system that implements the process 600 may perform functions at substantially the same time or in a specific sequence.

According to one or more examples, process 600 includes observing an indicated bit location at a parallel interface of a SerDes coupling a PHY with a physical transmission medium at operation 602. The indicated bit location may be a location of a bit of incoming or outgoing data at a PHY. The bit may be a Tx SerDes specific bit or an Rx SerDes arbitrary bit, as discussed herein.

According to one or more examples, process 600 includes generating a timestamp at least partially responsive to observing the indicated bit location at operation 604. The timestamp may be a Tx SerDes specific bit timestamp, a Rx SerDes arbitrary bit timestamp, Rx SerDes arbitrary bit timestamp, or packet timestamp, without limitation.

According to one or more examples, process 600 includes providing the timestamp for an upstream or downstream user at operation 606. The user may be, as non-limiting examples, a TimeSync client or user for higher layer processing. The user may be an upstream user in the case of Tx and a downstream user in the case of Rx.

Figure 7:
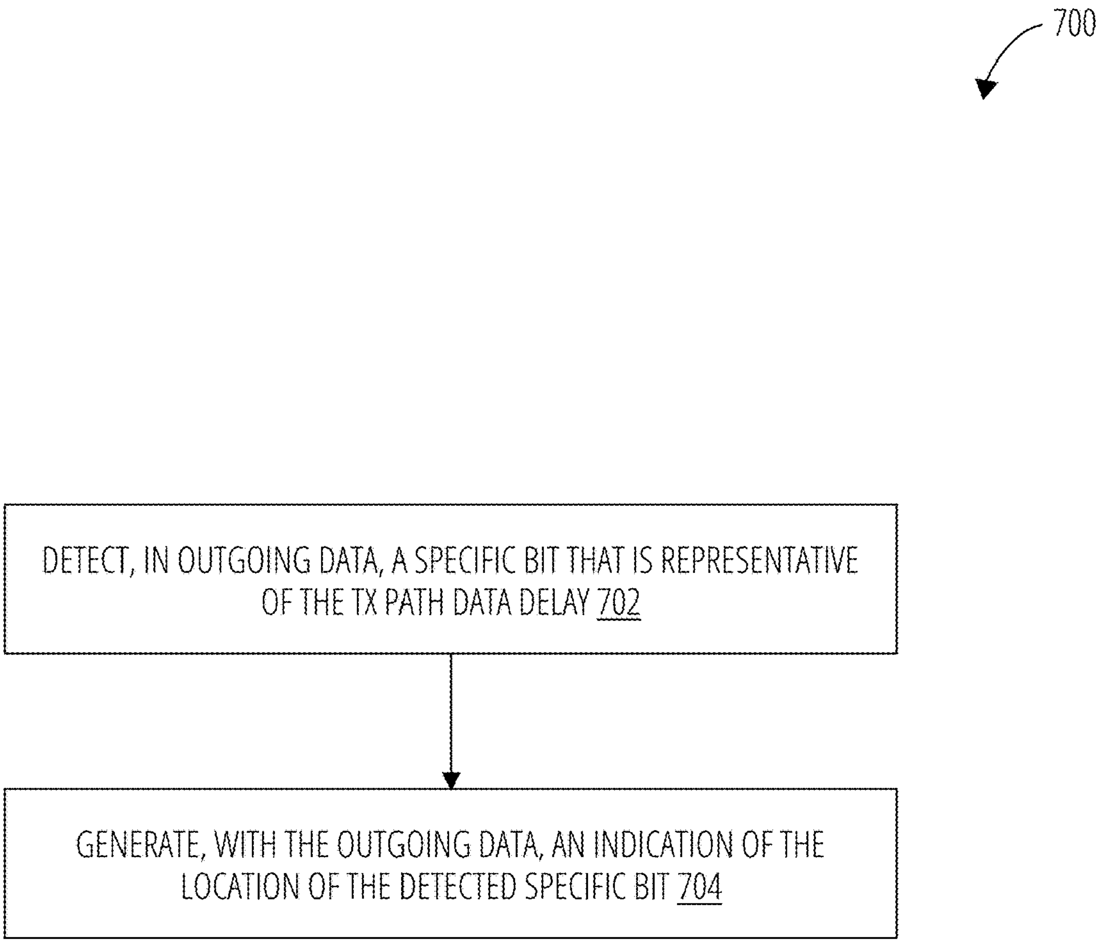
FIG. 7 is a flow-diagram depicting a process for adding an indicated bit location to outgoing data, in accordance with one or more examples.

FIG. 7 is a flow-diagram depicting a process 700 for adding an indicated bit location to outgoing data, in accordance with one or more examples. Some or a totality of operations of process 700 may be performed, as non-limiting examples, by apparatus 100, apparatus 200, or apparatus system 500.

Although the example process 700 depicts a particular sequence of operations, the sequence may be altered without departing from the scope of the present disclosure. For example, some of the operations depicted may be performed in parallel or in a different sequence that does not materially affect the function of process 700. In other examples, different components of an example device or system that implements the process 700 may perform functions at substantially the same time or in a specific sequence.

According to some examples, process 700 includes detecting, in outgoing data, a specific bit of the PHY-MAC interface at operation 702. The specific bit of the PHY-MAC interface may be an MII specific bit. The specific bit is an MII specific bit that is representative of the Tx path data delay.

According to some examples, process 700 includes adding, to the outgoing data, an indication of the location of the detected specific bit at operation 704. The location of the detected specific bit is the indicated bit location.

Figure 8:
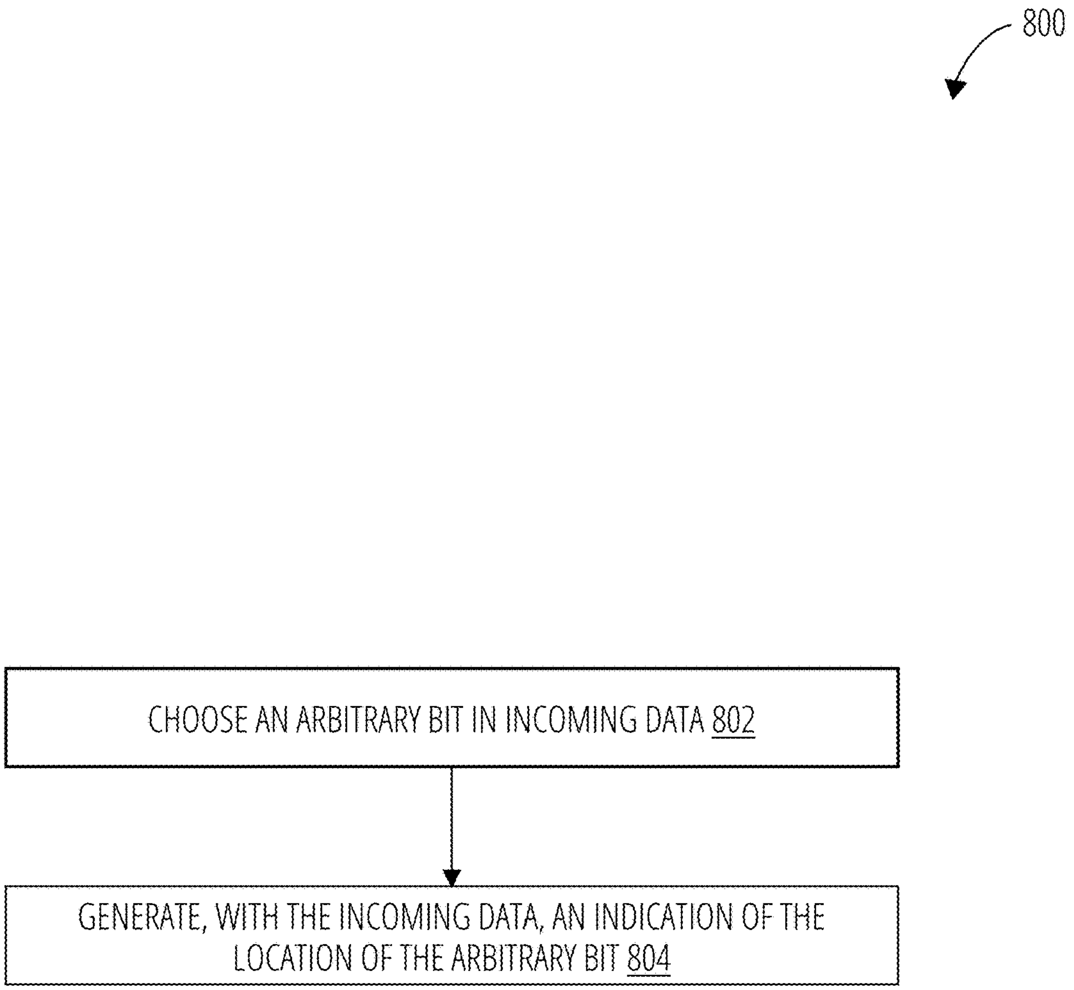
FIG. 8 is a flow diagram depicting a process for adding an indicated bit to incoming data, in accordance with one or more examples.

FIG. 8 is a flow diagram depicting a process 800 for adding an indicated bit location to incoming data, in accordance with one or more examples. Some or a totality of operations of process 800 may be performed, as non-limiting examples, by apparatus 100, apparatus 300, or apparatus system 500.

Although the example process 800 depicts a particular sequence of operations, the sequence may be altered without departing from the scope of the present disclosure. For example, some of the operations depicted may be performed in parallel or in a different sequence that does not materially affect the function of process 800. In other examples, different components of an example device or system that implements the process 800 may perform functions at substantially the same time or in a specific sequence.

According to some examples, process 800 includes choosing an arbitrary bit in incoming data at operation 802.

According to some examples, process 800 includes adding, to the incoming data, an indication that the arbitrary bit is the indicated bit at operation 804.

Figure 9:
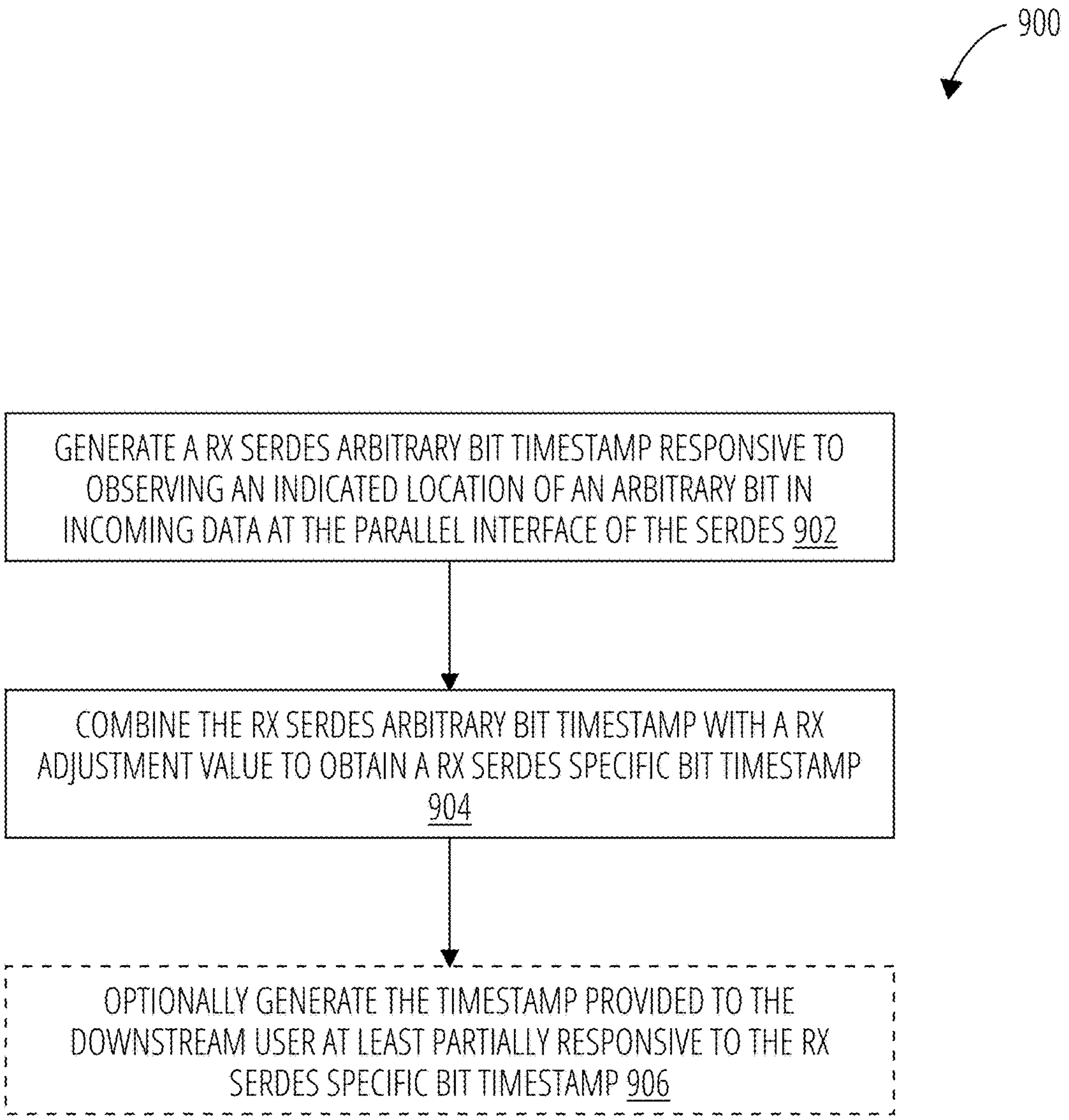
FIG. 9 is a flow diagram depicting a process for generating a timestamp responsive to observing an indicated arbitrary bit location, in accordance with one or more examples.

FIG. 9 is a flow diagram depicting a process 900 for generating the timestamp responsive to observing the indicated bit location, in accordance with one or more examples. Some or a totality of operations of process 900 may be performed, as non-limiting examples, by apparatus 100, apparatus 200 or system 500.

Although the example process 900 depicts a particular sequence of operations, the sequence may be altered without departing from the scope of the present disclosure. For example, some of the operations depicted may be performed in parallel or in a different sequence that does not materially affect the function of process 900. In other examples, different components of an example device or system that implements the process 900 may perform functions at substantially the same time or in a specific sequence.

According to one or more examples, process 900 includes generating an Rx SerDes arbitrary bit timestamp responsive to observing a location of an arbitrary bit in incoming data at the parallel interface of the SerDes at operation 902.

According to one or more examples, process 900 includes combining the Rx SerDes arbitrary bit timestamp with a Rx adjustment value to obtain a Rx SerDes specific bit timestamp at operation 904.

According to one or more examples, process 900 optionally includes generating the timestamp provided to the upstream or downstream user at least partially responsive to the Rx SerDes specific bit timestamp at operation 906.

Figure 10:
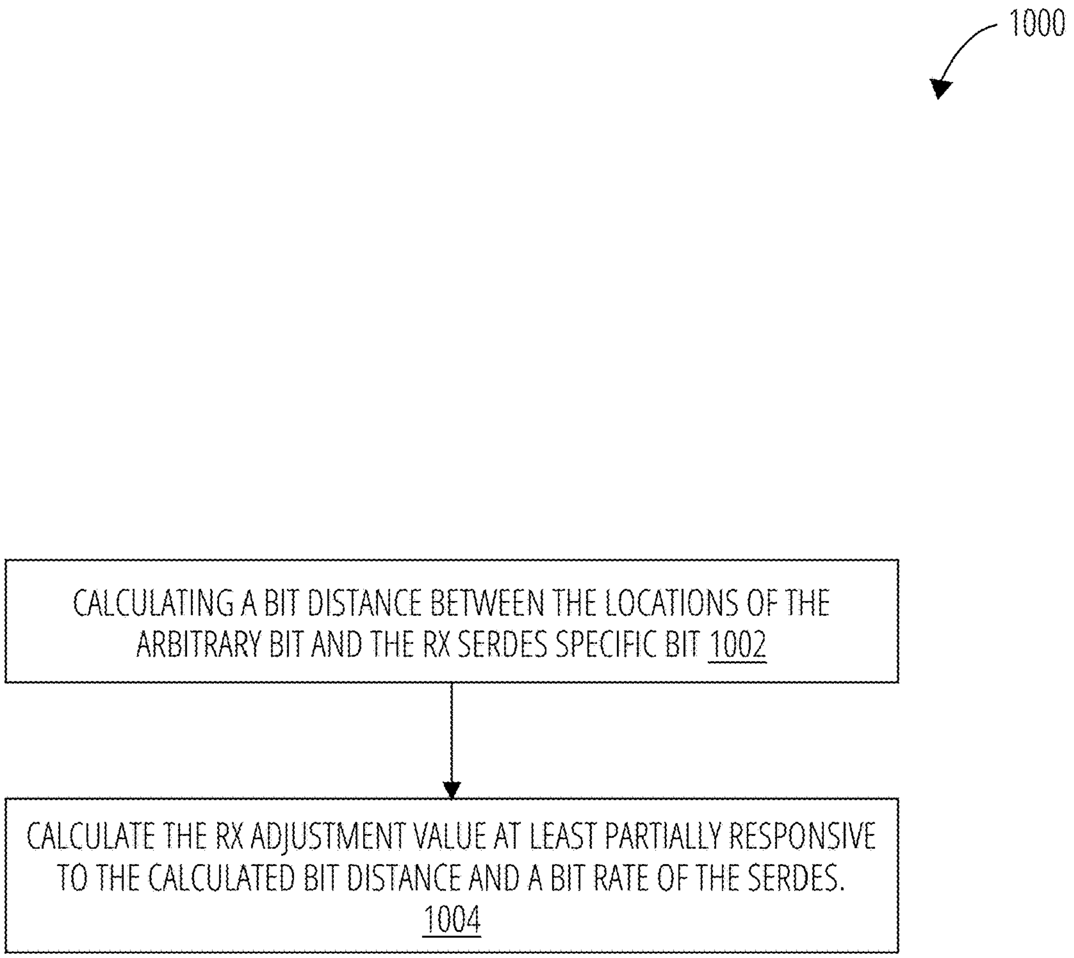
FIG. 10 is a flow diagram depicting a process for calculating an Rx adjustment value, in accordance with one or more examples.

FIG. 10 is a flow diagram depicting a process 1000 for calculating a Rx adjustment value, in accordance with one or more examples. Some or a totality of operations of process 1000 may be performed, as non-limiting examples, by apparatus 100, apparatus 400 or system 500.

Although the example process 1000 depicts a particular sequence of operations, the sequence may be altered without departing from the scope of the present disclosure. For example, some of the operations depicted may be performed in parallel or in a different sequence that does not materially affect the function of process 1000. In other examples, different components of an example device or system that implements the process 1000 may perform functions at substantially the same time or in a specific sequence.

According to one or more examples, process 1000 includes calculating a bit distance between the locations of the arbitrary bit and the Rx SerDes specific bit at operation 1002.

According to one or more examples, process 1000 includes calculating the Rx adjustment value at least partially responsive to the calculated bit distance and a bit rate of the SerDes at operation 1004.

Figure 11:
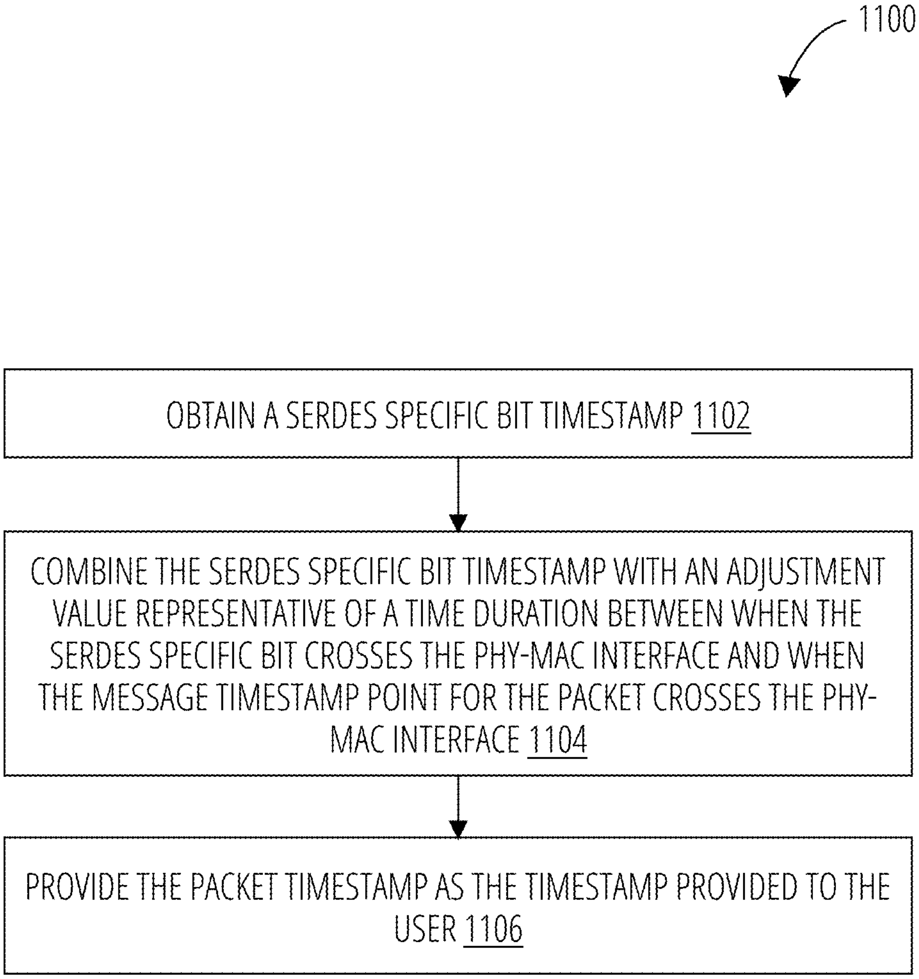
FIG. 11 is a flow diagram depicting a process for generating the timestamp responsive to observing the indicated bit location, in accordance with one or more examples.

FIG. 11 is a flow diagram depicting a process 1100 for generating the timestamp responsive to observing the indicated bit location in outgoing data, in accordance with one or more examples. Some or a totality of operations of process 1100 may be performed, as non-limiting examples, by apparatus 100, apparatus 300 or system 500.

Although the example process 1100 depicts a particular sequence of operations, the sequence may be altered without departing from the scope of the present disclosure. For example, some of the operations depicted may be performed in parallel or in a different sequence that does not materially affect the function of process 1100. In other examples, different components of an example device or system that implements the process 1100 may perform functions at substantially the same time or in a specific sequence.

According to one or more examples, process 1100 includes receiving a SerDes specific bit timestamp at operation 1102. In one or more examples, the SerDes Specific bit timestamp may be a Rx SerDes specific bit timestamp or a Tx SerDes specific bit timestamp.

According to one or more examples, process 1100 at operation 1104 includes combining the SerDes specific bit timestamp with an adjustment value. The adjustment value is representative of a time duration between when the SerDes specific bit crosses the PHY-MAC interface and when the message timestamp point for the packet crosses the PHY-MAC interface. The PHY-MAC interface may be an MII or MII equivalent. The packet timestamp represents when the message timestamp point crossed the PHY-MAC interface. The adjustment value may be predetermined or calculated as the distance, in bits, between a message timestamp point and the SerDes specific bit multiplied by the PH-MAC interface bit time (e.g., MII or MII equivalent bit time, without limitation).

According to some examples, process 1100 includes providing the packet timestamp as the timestamp provided to the user at operation 1106.

Figure 12:
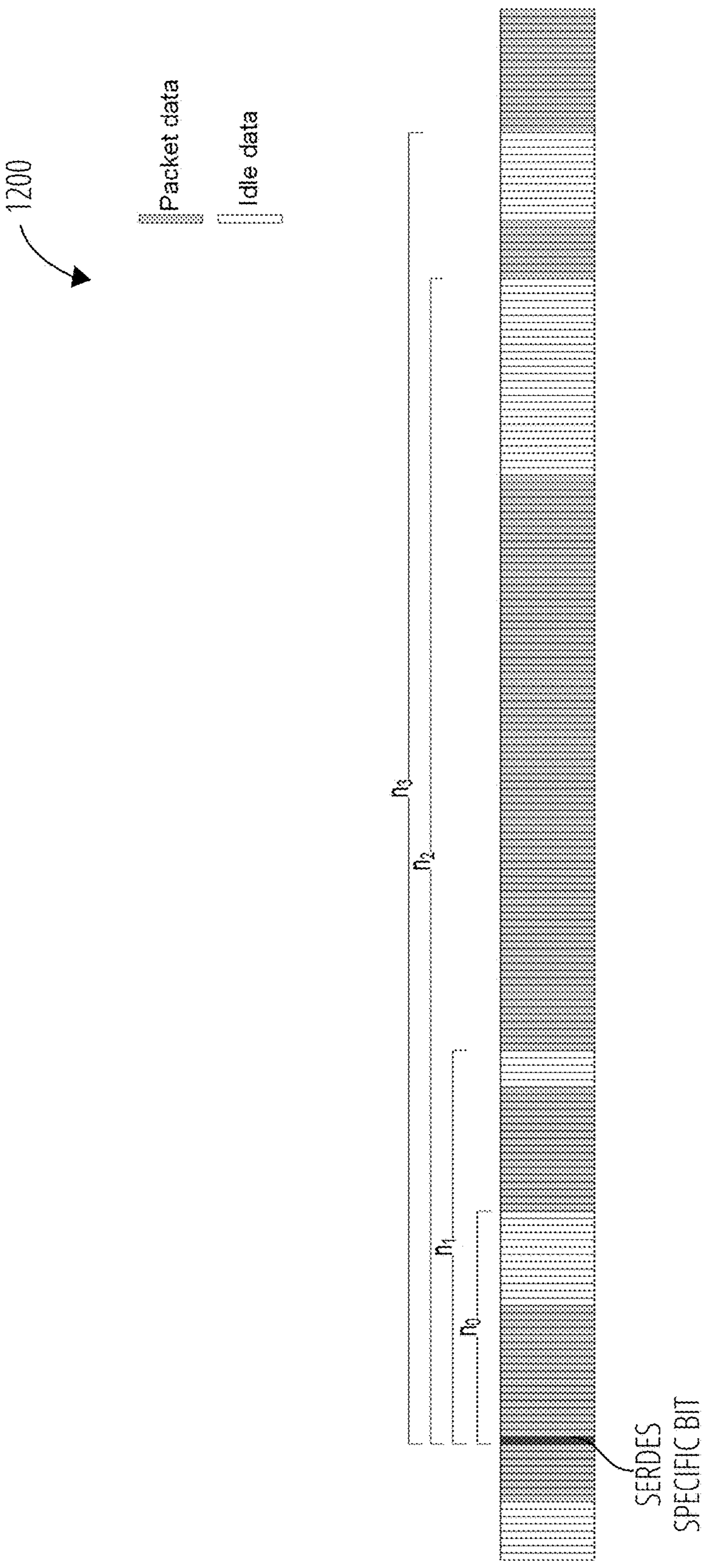
FIG. 12 is a schematic diagram of example packet that includes an indicated bit location, in accordance with one or more examples.

FIG. 12 is a schematic diagram of example packet 1200 that includes an indicated bit location of a SerDes specific bit.

The timestamp of the packet 1200 is calculated as:

packet timestamp=((SerDes Specific bit timestamp)+($n_i$))*(MII bit time), where "$n_i$" is the MII bit distance between the specific bit and packet i's message timestamp point. Examples of distances to various example message timestamp points are depicted, the distances denoted as distance $n_0$, $n_1$, $n_2$ and $n_3$. The location of a message timestamp point may differ at least partially based on specific operational context, as a non-limiting example, which standard is being used.

Figure 13:
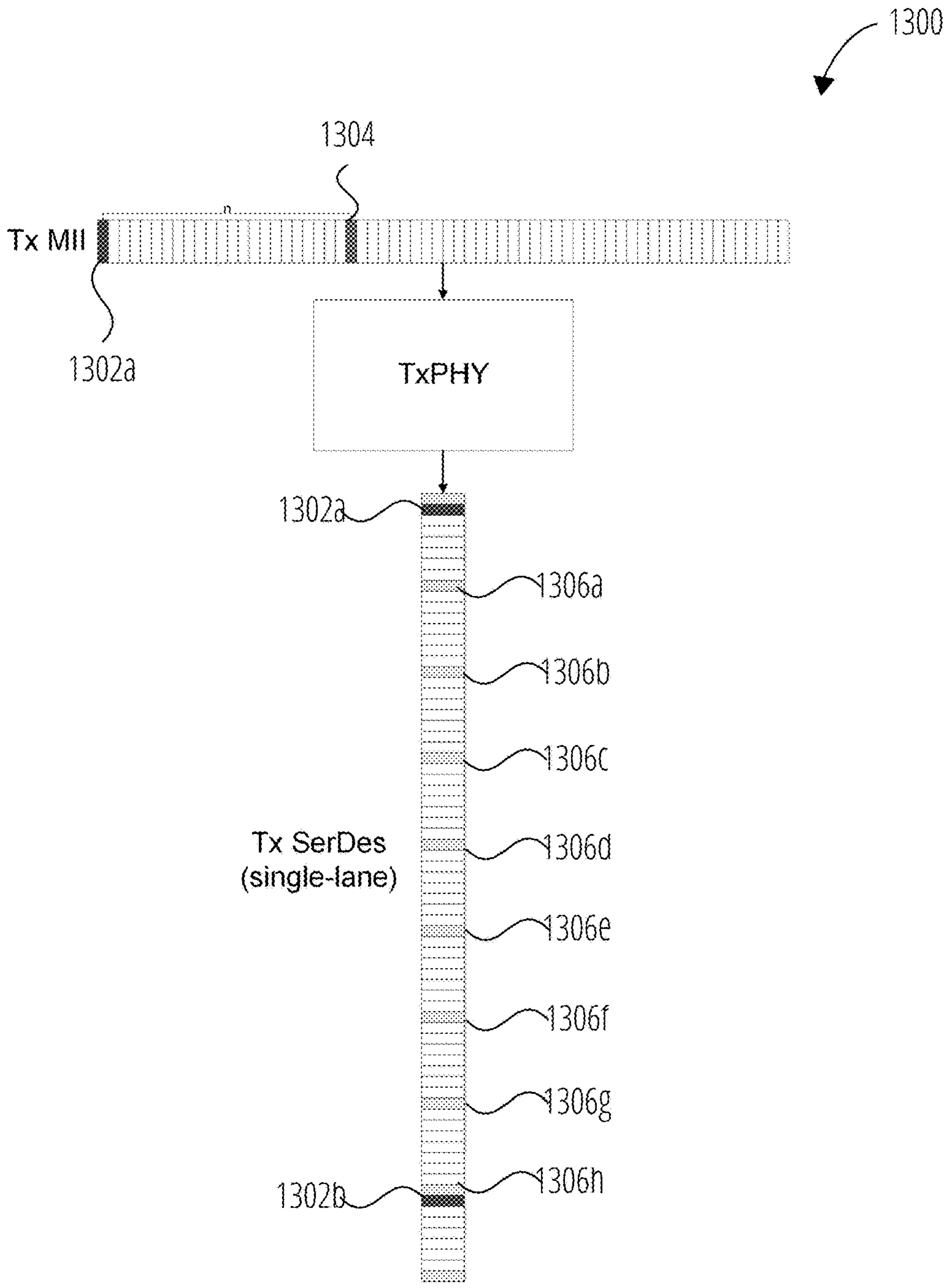
FIG. 13 is a schematic diagram depicting an example Tx data path, in accordance with one or more examples.

FIG. 13 is a schematic diagram depicting an example Tx data path 1300, in accordance with one or more examples.

Depicted are representations of data streams (e.g., present at respective one or more first-in-first-out buffers (FIFO), without limitation) for Tx MII (which may be a physical MII or MII equivalent) and a single lane SerDes interface.

The Tx MII data stream includes Tx SerDes specific bit 1302*a* and message timestamp point 1304. The distance between Tx SerDes specific bit 1302*a* and message timestamp point 1304 is distance "n." The lane data stream from the TxPHY includes Tx SerDes specific bit 1302*a*, another instance of the specific bit 1302*b*, and added bits 1306*a*-1306*h*. These added bits were added by the TxPHY functions and not present at the MII, thus, they cannot be representative of the Tx path data delay.

Logic in the Tx PHY determines the specific bit (here Tx SerDes specific bit 1302*a*) that is representative of the Tx path data delay (i.e., Tx SerDes specific bit 1302*a*), where it falls on the SerDes lanes and the Tx MII. The regularly occurring bits utilized as the specific bit are flagged (i.e., locations are indicated) towards the Tx SerDes, on each lane, here a single lane.

The choice of specific bit location is at least partially based on the function of the TxPHY. As a non-limiting example, if the TxPHY inserts FEC parity bits (light pink), the specific bits representative of the path data delay would fall directly after the FEC parity bits.

Figure 14:
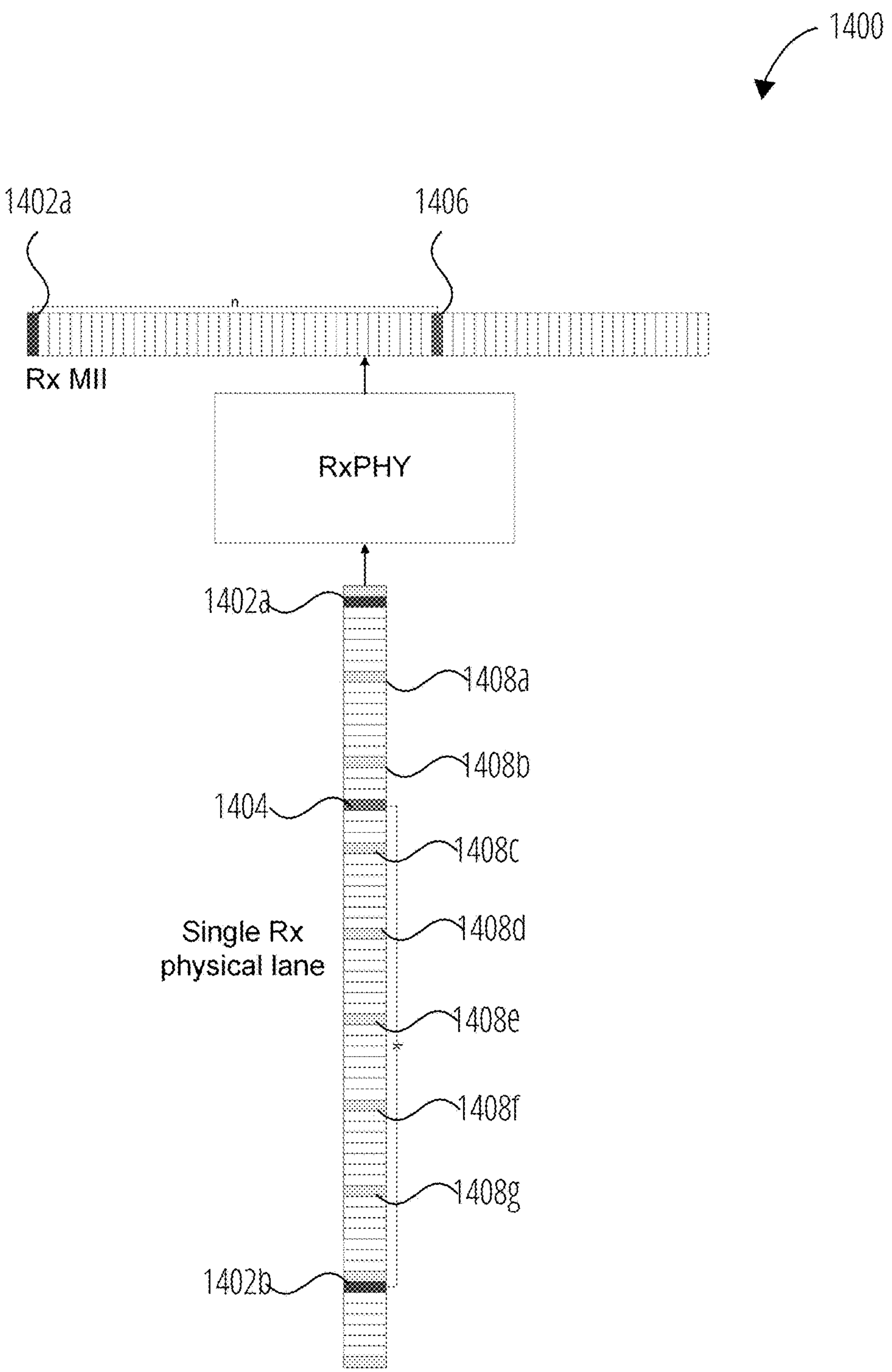
FIG. 14 is a schematic diagram depicting an example Rx data path, in accordance with one or more examples.

FIG. 14 is a schematic diagram depicting an example Rx data path 1400, in accordance with one or more examples.

Depicted are representations of data streams (e.g., present at respective one or more first-in-first-out buffers (FIFO), without limitation) for Rx MII (which may be a physical MII or MII equivalent) and a single lane SerDes interface. The Rx MII data stream includes specific bit 1402*a* and message timestamp point 1406. Single lane data stream from the Rx PHY includes specific bit 1402*a*, a further instance of specific bit 1402*b*, arbitrary bit 1404, and bits to-be-removed 1408*a*-*g*. The bits to-be-removed 1408*a*-1408*g* are bits that will be removed by the functions of the Rx PHY and so cannot be representative of Rx path data delay because they are not present at the Rx MII.

The distance "n" is the Rx MII bit distance, i.e., the distance between Rx MII specific bit (the Rx SerDes specific bit) and a packet's message timestamp point.

"k" is the SerDes lane bit distance between the arbitrary flagged bit and the specific bit representative of the Rx path data delay.

Logic in the RxPHY determines the specific bit that is representative of the Rx path data delay (SerDes specific bit 1402), where it falls on the SerDes lane and the corresponding RxMII bit. Logic in the RxPHY measures the bit distance between the arbitrary flagged bit from the RxSerDes (blue) and specific bits representative of the Rx path data delay.

Figure 15:
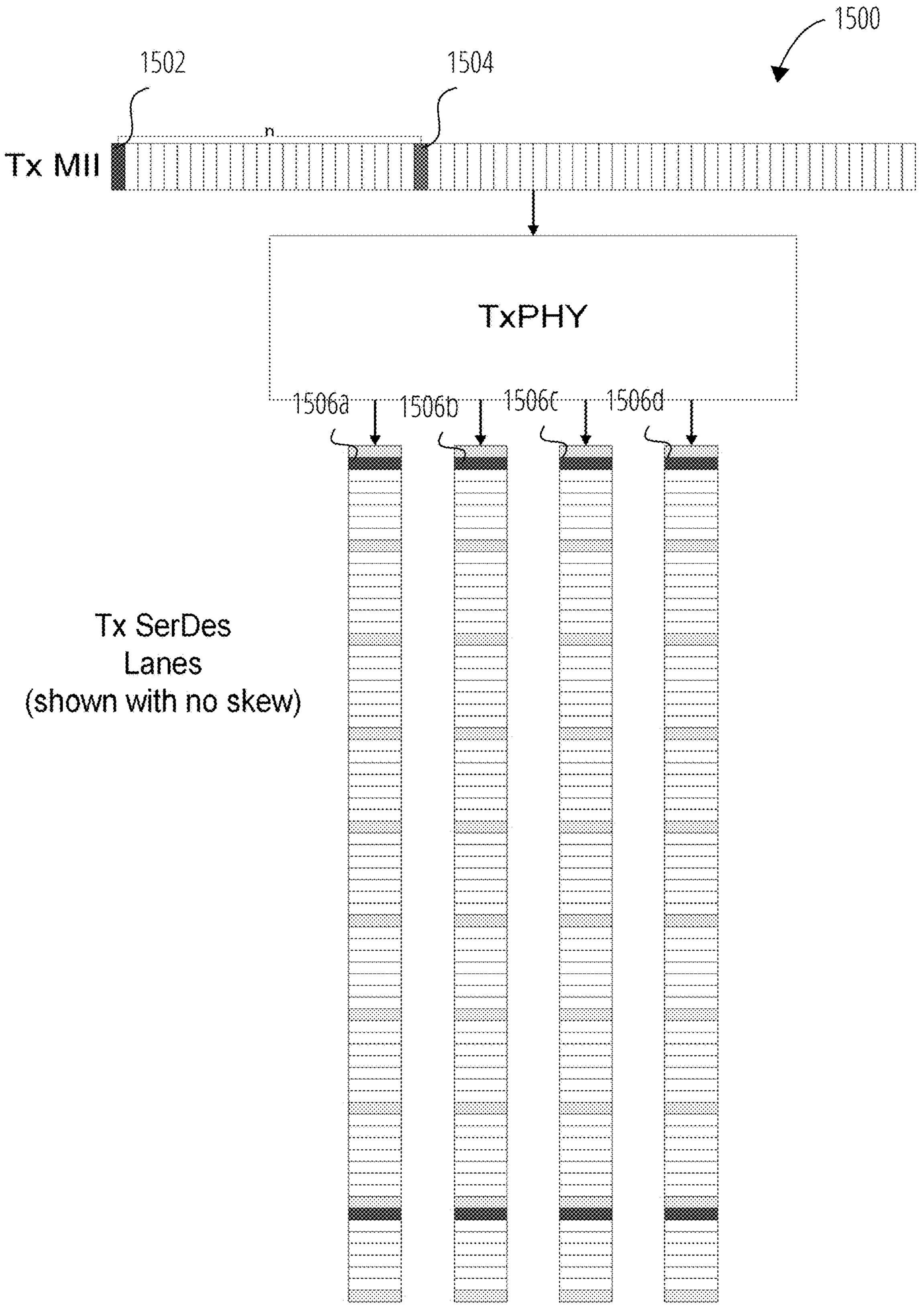
FIG. 15 is a schematic diagram depicting an example Tx data path, in accordance with one or more examples.

FIG. 15 is a schematic diagram depicting an example Tx path 1500, in accordance with one or more examples.

Depicted are representations of data streams (e.g., present at respective one or more FIFOs, without limitation) for the Tx MII (which may be a physical MII or MII equivalent) and four lanes of a SerDes interface.

The distance "n" is the MII bit distance, i.e., the distance between Tx MII specific bit 1502 (the Tx SerDes specific bit) and a packet's message timestamp point 1504.

Logic in the Tx PHY determines: the location of the specific bit that is representative of the Tx path data delay on the TxMII, the corresponding per-lane Tx SerDes specific bits 1506*a*, 1506*b*, 1506*c*, and 1506*d* (indicated with filled in cells), and where they fall on the SerDes lanes. The locations of the bits are indicated towards the Tx SerDes, on each lane. Added bits are depicted by FIG. 15 but not labeled again.

Figure 16:
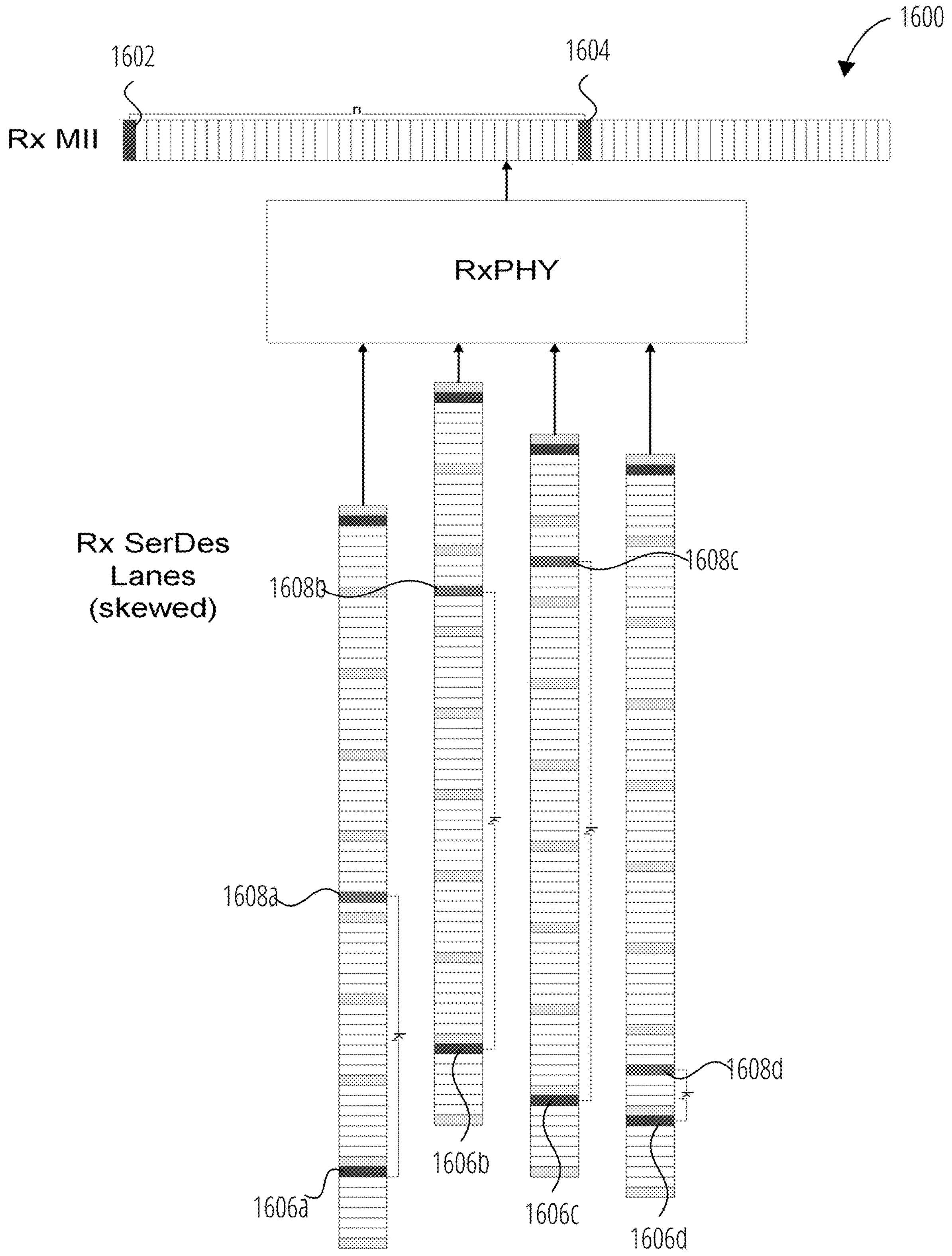
FIG. 16 is a schematic diagram depicting an example Rx data path, in accordance with one or more examples.

FIG. 16 is a schematic diagram depicting an example Rx path 1600, in accordance with one or more examples.

Depicted are representations of data streams (e.g., present at respective FIFOs, without limitation) for the Rx MII (which may be a physical MII or MII equivalent) and four lanes of a SerDes interface.

The distance "n" is the MII bit distance, i.e., the distance between Rx MII specific bit 1602 (the Tx SerDes specific bit) and a packet's message timestamp point 1604.

Logic in the RxPHY determines the per lane Rx SerDes Specific bits 1606*a*, 1606*b*, 1606*c*, and 1606*d* that are representative of the Rx path data delay (indicated in red). Where the bit falls on the Rx MII (after framing and deskew) is determined. Logic in the RxPHY calculates the bit distance between the per lane Rx SerDes arbitrary bit 1608*a*, 1608*b*, 1608*c* and 1608*d* from the Rx SerDes and the per lane Rx SerDes Specific bits 1606*a*, 1606*b*, 1606*c*, and 1606*d* representative of the Rx path data delay.

"$k_i$" is the arbitrary-to-specific SerDes bit distance, i.e., the bit distance between a Rx SerDes arbitrary bit and the Rx SerDes specific bit representative of the path data delay, per SerDes lane i, where "i" is an integer greater than or equal to 0 utilized to denote respective SerDes lanes.

Bits to be removed are depicted by FIG. 16 but not labeled again.

Figure 17:
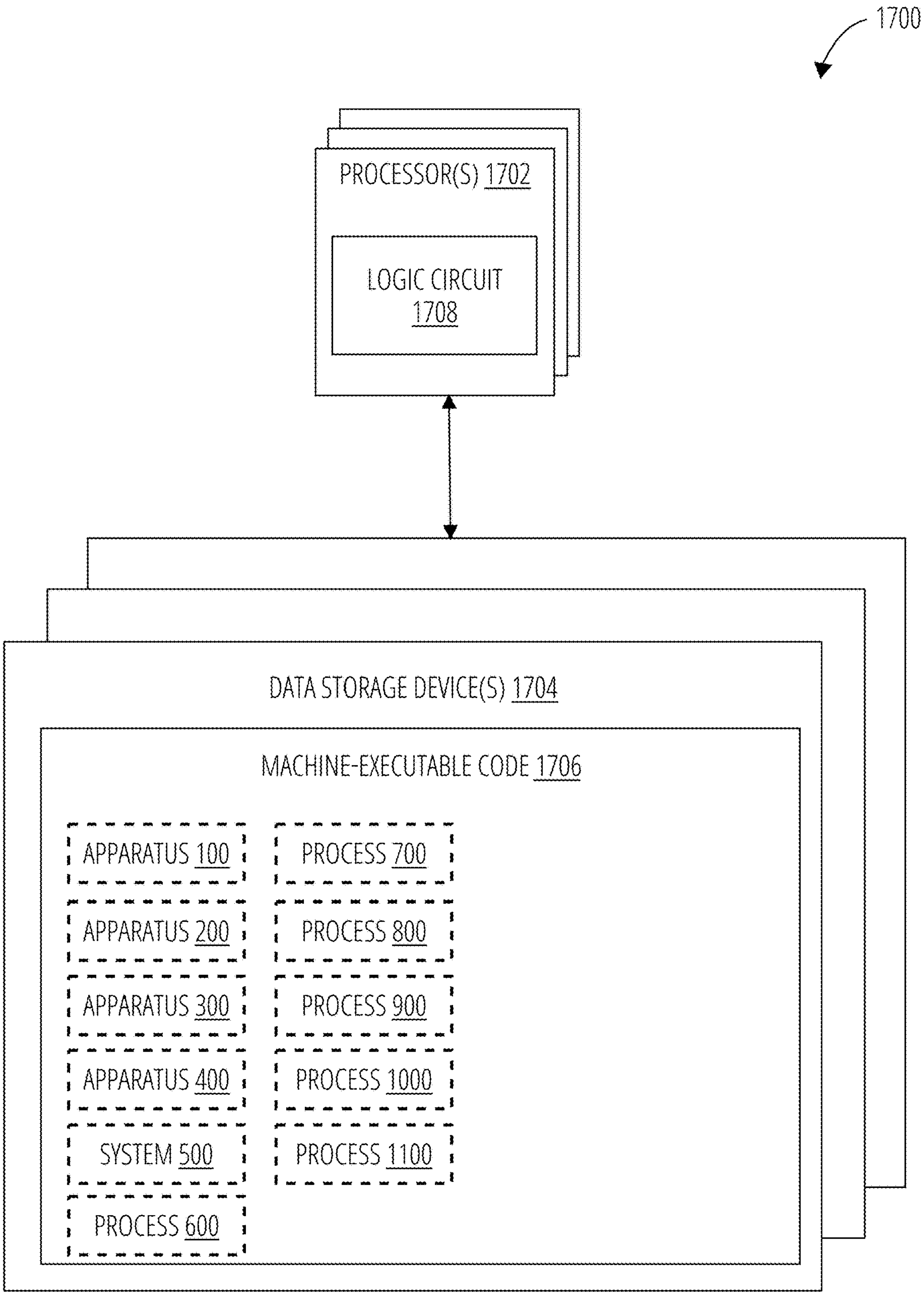
FIG. 17 is a block diagram of a circuitry that, in some examples, may be used to implement various functions, operations, acts, processes, or methods disclosed herein.

FIG. 17 is a block diagram of a circuitry 1700 that, in some examples, may be used to implement various functions, operations, acts, processes, or methods disclosed herein. The circuitry 1700 includes one or more processors 1702 (sometimes referred to herein as "processors 1702") operably coupled to one or more data storage devices 1704 (sometimes referred to herein as "storage 1704"). The storage 1704 includes machine-executable code 1706 stored thereon and the processors 1702 includes logic circuit 1708. The machine-executable code 1706 information describes functional elements that may be implemented by (e.g., performed by) the logic circuit 1708. The logic circuit 1708 is adapted to implement (e.g., perform) the functional elements described by the machine-executable code 1706. The circuitry 1700, when executing the functional elements described by the machine-executable code 1706, should be considered as special purpose hardware for carrying out functional elements disclosed herein. In some examples the processors 1702 may perform the functional elements described by the machine-executable code 1706 sequentially, concurrently (e.g., on one or more different hardware platforms), or in one or more parallel process streams.

When implemented by logic circuit 1708 of the processors 1702, the machine-executable code 1706 adapts the processors 1702 to perform operations of examples disclosed herein. By way of non-limiting example, the machine-executable code 1706 may adapt the processors 1702 to perform some or a totality of operations of one or more of: process 600, process 700, process 800, process 900, process 1000, and process 1100.

Also, by way of non-limiting example, the machine-executable code 1706 may adapt the processors 1702 to perform some or a totality of features, functions, or operations disclosed herein for one or more of: apparatus 100, apparatus 200, apparatus 300, apparatus 400, or system 500. More specifically, features, functions, or operations disclosed herein for one or more of: PHY portion 102, logic circuit 104, adjustment value 106, SerDes 108, parallel interface 110, bit location detector 112, timestamp logic circuit 114, or indicated bit location 116 of FIG. 1; Tx timing signal generation circuit 206 of FIG. 2; RX timing signal generation 302 and optional SerDes Parallel interface 308 of FIG. 3; Rx signal timing adjustment circuit 402 and optional Rx PHY 414 of FIG. 4; or an Ethernet PHY 502, Tx timing generator 504, Rx PHY 506, Tx PHY 508, SerDes 510, parallel interface 512, Tx timing signal 514, Rx timing generator 516, timestamper 518, Tx SerDes Specific bit timestamp 522, Rx arbitrary timestamp 524, packet timestamping logic 530, MII or MII equivalent 538, MDI 534, or physical transmission medium 536 of FIG. 5.

The processors 1702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes functional elements corresponding to the machine-executable code 1706 (e.g., software code, firmware code, hardware descriptions) related to examples of the present disclosure. It is noted that a general-purpose processor (may also be referred to herein as a host processor or simply a host) may be a microprocessor, but in the alternative, the processors 1702 may include any conventional processor, controller, microcontroller, or state machine. The processors 1702 may also be implemented as a combination of computing devices, such as a combination of a DSP and a microprocessor, a plurality of microprocessors, one or more microprocessors in conjunction with a DSP core, or any other such configuration.

In some examples the storage 1704 includes volatile data storage (e.g., arbitrary-access memory (RAM)), non-volatile data storage (e.g., Flash memory, a hard disc drive, a solid-state drive, erasable programmable read-only memory (EPROM), without limitation). In some examples the processors 1702 and the storage 1704 may be implemented into a single device (e.g., a semiconductor device product, a system on chip (SOC), without limitation). In some examples the processors 1702 and the storage 1704 may be implemented into separate devices.

In some examples the machine-executable code 1706 may include computer-readable instructions (e.g., software code, firmware code). By way of non-limiting example, the computer-readable instructions may be stored by the storage 1704, accessed directly by the processors 1702 and executed by the processors 1702 using at least the logic circuit 1708. Also, by way of non-limiting example, the computer-readable instructions may be stored on the storage 1704, transferred to a memory device (not shown) for execution, and executed by the processors 1702 using at least the logic circuit 1708. Accordingly, in some examples the Tx PHY 508 includes electrically configurable logic circuit 1708.

In some examples the machine-executable code 1706 may describe hardware (e.g., circuitry) to be implemented in the logic circuit 1708 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog, SystemVerilog or very large-scale integration (VLSI) hardware description language (VHDL) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuit 1708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 1706 may include an HDL, an RTL, a GL description, a mask level description, other hardware description, or any combination thereof.

In examples where the machine-executable code 1706 includes a hardware description (at any level of abstraction), a system (not shown, but including the storage 1704) implements the hardware description described by the machine-executable code 1706. By way of non-limiting example, the processors 1702 may include a programmable logic device (e.g., an FPGA or a PLC) and the logic circuit 1708 may be electrically controlled to implement circuitry corresponding to the hardware description into the logic circuit 1708. Also, by way of non-limiting example, the logic circuit 1708 may include hard-wired logic manufactured by a manufacturing system (not shown but including the storage 1704) according to the hardware description of the machine-executable code 1706.

Regardless of whether the machine-executable code 1706 includes computer-readable instructions or a hardware description, the logic circuit 1708 is adapted to perform the functional elements described by the machine-executable code 1706 when implementing the functional elements of the machine-executable code 1706. It is noted that although a hardware description may not directly describe functional elements, a hardware description indirectly describes functional elements that the hardware elements described by the hardware description are capable of performing.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. As used herein, "each" means some or a totality, and "each and every" means a totality.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples include:

Example 1: A method, comprising: observing an indicated bit location at a parallel interface of a SerDes coupling a PHY with a physical transmission medium; generating a timestamp at least partially responsive to observing the indicated bit location; and providing the timestamp to a user.

Example 2: The method according to Example 1, comprising: detecting a specific bit representative of a Tx path data delay; and generating an indication of location of the detected specific bit.

Example 3: The method according to any of Examples 1 and 2, wherein the detecting the specific bit representative of the Tx path data delay comprises: detecting, in outgoing data, the specific bit representative of the Tx path data delay.

Example 4: The method according to any of Examples 1 through 3, wherein the generating the indication of location of the detected specific bit comprises: generating, with outgoing data, the indication of the location of the detected specific bit.

Example 5: The method according to any of Examples 1 through 4, wherein the generating the timestamp at least partially responsive to observing the indicated bit location comprises: obtaining a SerDes specific bit timestamp at least partially responsive to observing the indicated bit location at the parallel interface of the SerDes; combining the SerDes specific bit timestamp with an adjustment value to obtain a packet timestamp; and providing the packet timestamp as the timestamp provided to the user.

Example 6: The method according to any of Examples 1 through 5, wherein the adjustment value being representative of a time duration between when the SerDes specific bit crosses a PHY-MAC interface and when a message timestamp point of the packet crosses the PHY-MAC interface.

Example 7: The method according to any of Examples 1 through 6, wherein obtaining the SerDes specific bit timestamp at least partially responsive to observing the indicated bit location at the parallel interface of the SerDes comprises: generating a Rx SerDes arbitrary bit timestamp responsive to observing an indicated location of an arbitrary bit in incoming data at the parallel interface of the SerDes; and combining the Rx SerDes arbitrary bit timestamp with a Rx adjustment value to obtain a Rx SerDes specific bit timestamp.

Example 8: The method according to any of Examples 1 through 7, comprising: calculating a bit distance between the indicated bit location of the arbitrary bit and a bit location of a Rx SerDes specific bit; and calculating the Rx adjustment value at least partially responsive to the calculated bit distance and a bit rate of the SerDes.

Example 9: The method according to any of Examples 1 through 8, wherein generating the SerDes specific bit timestamp at least partially responsive to observing the indicated bit location at the parallel interface of the SerDes comprises: generating a Tx SerDes specific bit timestamp at least partially responsive to observing the indicated bit location of outgoing data at the parallel interface of the SerDes.

Example 10: The method according to any of Examples 1 through 9, wherein the user is a TimeSync client.

Example 11: An apparatus, comprising: a SerDes to couple a PHY to a physical transmission medium; a timestamp logic circuit; a bit detector coupled to initiate the timestamp logic circuit at least partially responsive to observing an indicated bit location at a parallel interface of the SerDes; and a logic circuit provided at a portion of the PHY, the logic circuit coupled to receive timestamps generated by the timestamp logic circuit and generate packet timestamps at least partially based thereon.

Example 12: The apparatus according to Example 11, comprising a Tx timing signal generation circuit to: detect a bit of outgoing data that is visible at a PHY-MAC interface; and generate an indication, with the outgoing data, that the detected bit is the indicated bit.

Example 13: The apparatus according to any of Examples 11 and 12, comprising an Rx timing signal generation circuit to: observe an arbitrary bit of incoming data; and generate an indication, with the incoming data, of a bit location of the arbitrary bit.

Example 14: The apparatus according to any of Examples 11 through 13, wherein the timestamp logic circuit to: change a hardware timestamp at least partially responsive to an Rx adjustment value, wherein the Rx adjustment value is representative of a time duration between when an arbitrary bit crosses the parallel interface of the SerDes and when a SerDes specific bit crosses the parallel interface of the SerDes.

Example 15: The apparatus according to any of Examples 11 through 14, wherein the timestamp logic circuit to: remove the indication of bit location of the arbitrary bit and generate an indication of bit location of the SerDes specific bit.

Example 16: The apparatus according to any of Examples 11 through 15, wherein the logic circuit to: calculate a bit distance between the indicated bit location of the arbitrary bit and a bit location of a SerDes specific bit to obtain an arbitrary-to-specific SerDes bit distance; and calculate the Rx adjustment value at least partially responsive to the arbitrary-to-specific SerDes bit distance and a SerDes bit time.

Example 17: The apparatus according to any of Examples 11 through 16, wherein the SerDes is provided at a physical media attachment sublayer of the PHY.

Example 18: The apparatus according to any of Examples 11 through 17, comprising: a local time source.

Example 19: The apparatus according to any of Examples 11 through 18, wherein the timestamp logic circuit includes a hardware timestamper.

Example 20: A system comprising: a SerDes interface; a timestamp logic circuit to generate timestamps; a bit location detector to observe an indicated bit location at a parallel interface of the SerDes; and initiate the timestamp logic circuit; and a logic circuit to receive the timestamps generated by the timestamp logic circuit and generate packet timestamps at least partially based thereon.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. A method, comprising:

observing an indicated bit location at a parallel interface of a SerDes coupling a PHY with a physical transmission medium;

generating a timestamp at least partially responsive to observing the indicated bit location; and providing the timestamp to a user;

wherein the generating the timestamp at least partially responsive to observing the indicated bit location comprises:

obtaining a SerDes specific bit timestamp at least partially responsive to observing the indicated bit location at the parallel interface of the SerDes;

combining the SerDes specific bit timestamp with an adjustment value to obtain a packet timestamp; and providing the packet timestamp as the timestamp provided to the user.

2. The method of claim 1, comprising:

detecting a specific bit representative of a Tx path data delay; and generating an indication of location of the detected specific bit.

3. The method of claim 2, wherein the detecting the specific bit representative of the Tx path data delay comprises:

detecting, in outgoing data, the specific bit representative of the Tx path data delay.

4. The method of claim 2, wherein the generating the indication of location of the detected specific bit comprises:

generating, with outgoing data, the indication of the location of the detected specific bit.

5. The method of claim 1, wherein the adjustment value being representative of a time duration between when the SerDes specific bit crosses a PHY-MAC interface and when a message timestamp point of the packet crosses the PHY-MAC interface.

6. The method of claim 1, wherein obtaining the SerDes specific bit timestamp at least partially responsive to observing the indicated bit location at the parallel interface of the SerDes comprises:

generating a Rx SerDes arbitrary bit timestamp responsive to observing an indicated location of an arbitrary bit in incoming data at the parallel interface of the SerDes; and combining the Rx SerDes arbitrary bit timestamp with a Rx adjustment value to obtain a Rx SerDes specific bit timestamp.

7. The method of claim 6, comprising:

calculating a bit distance between the indicated bit location of the arbitrary bit and a bit location of a Rx SerDes specific bit; and calculating the Rx adjustment value at least partially responsive to the calculated bit distance and a bit rate of the SerDes.

8. The method of claim 7, wherein generating the SerDes specific bit timestamp at least partially responsive to observing the indicated bit location at the parallel interface of the SerDes comprises:

generating a Tx SerDes specific bit timestamp at least partially responsive to observing the indicated bit location of outgoing data at the parallel interface of the SerDes.

9. The method of claim 6, comprising:

choosing, in the incoming data, an arbitrary bit; and generating, with the incoming data, an indication of location of a detected arbitrary bit.

10. The method of claim 1, wherein the user is a TimeSync client.

11. An apparatus, comprising:

a SerDes to couple a PHY to a physical transmission medium;

a timestamp logic circuit;

a bit detector coupled to initiate the timestamp logic circuit at least partially responsive to observing an indicated bit location at a parallel interface of the SerDes; and a logic circuit provided at a portion of the PHY, the logic circuit coupled to receive timestamps generated by the timestamp logic circuit and generate packet timestamps at least partially based thereon by combining a SerDes specific bit timestamp of the timestamps with an adjustment value.

12. The apparatus of claim 11, comprising a Tx timing signal generation circuit to:

detect a bit of outgoing data that is visible at a PHY-MAC interface; and generate an indication, with the outgoing data, that the detected bit is the indicated bit.

13. The apparatus of claim 11, comprising an Rx timing signal generation circuit to:

observe an arbitrary bit of incoming data; and generate an indication, with the incoming data, of a bit location of the arbitrary bit.

14. The apparatus of claim 11, wherein the timestamp logic circuit to:

change a hardware timestamp at least partially responsive to an Rx adjustment value, wherein the Rx adjustment value is representative of a time duration between when an arbitrary bit crosses the parallel interface of the SerDes and when a SerDes specific bit crosses the parallel interface of the SerDes.

15. The apparatus of claim 14, wherein the timestamp logic circuit to:

remove the indication of bit location of the arbitrary bit and generate an indication of bit location of the SerDes specific bit.

16. The apparatus of claim 14, wherein the logic circuit to:

calculate a bit distance between the indicated bit location of the arbitrary bit and a bit location of a SerDes specific bit to obtain an arbitrary-to-specific SerDes bit distance; and calculate the Rx adjustment value at least partially responsive to the arbitrary-to-specific SerDes bit distance and a SerDes bit time.

17. The apparatus of claim 11, wherein the SerDes is provided at a physical media attachment sublayer of the PHY.

18. The apparatus of claim 11, comprising: a local time source.

19. The apparatus of claim 11, wherein the timestamp logic circuit includes a hardware timestamper.

20. A system comprising:

a SerDes interface;

a timestamp logic circuit to generate timestamps;

a bit location detector to observe an indicated bit location at a parallel interface of the SerDes; and initiate the timestamp logic circuit; and a logic circuit to receive the timestamps generated by the timestamp logic circuit and generate packet timestamps at least partially based thereon by combining a SerDes specific bit timestamp of the timestamps with an adjustment value.

* * * * *